United States Patent
Terada et al.

(10) Patent No.: US 11,546,606 B2
(45) Date of Patent: *Jan. 3, 2023

(54) VIDEO ENCODING METHOD, VIDEO DECODING METHOD, VIDEO ENCODING APPARATUS, AND VIDEO DECODING APPARATUS

(71) Applicant: Sun Patent Trust, New York, NY (US)

(72) Inventors: Kengo Terada, Osaka (JP); Takahiro Nishi, Nara (JP); Hisao Sasai, Osaka (JP); Satoshi Yoshikawa, Hyogo (JP)

(73) Assignee: SUN PATENT TRUST, New York, NY (US)

(*) Notice: Subject to any disclaimer, the term of this patent is extended or adjusted under 35 U.S.C. 154(b) by 45 days.

This patent is subject to a terminal disclaimer.

(21) Appl. No.: 17/122,447

(22) Filed: Dec. 15, 2020

(65) Prior Publication Data

US 2021/0099714 A1 Apr. 1, 2021

Related U.S. Application Data

(63) Continuation of application No. 16/843,468, filed on Apr. 8, 2020, now Pat. No. 10,939,121, which is a
(Continued)

(51) Int. Cl.
*H04N 19/146* (2014.01)
*H04N 19/132* (2014.01)
(Continued)

(52) U.S. Cl.
CPC ......... *H04N 19/146* (2014.11); *H04N 19/105* (2014.11); *H04N 19/132* (2014.11);
(Continued)

(58) Field of Classification Search
CPC ..................................................... H04N 19/146
(Continued)

(56) References Cited

U.S. PATENT DOCUMENTS

| 8,401,085 B2 | 3/2013 | Park et al. |
| 8,428,144 B2 | 4/2013 | Park et al. |

(Continued)

FOREIGN PATENT DOCUMENTS

| JP | 2000-324486 | 11/2000 |
| JP | 2009-540734 | 11/2009 |

(Continued)

OTHER PUBLICATIONS

International Search Report dated Aug. 12, 2014 in International (PCT) Application No. PCT/JP2014/002974.
(Continued)

*Primary Examiner* — Yulin Sun
(74) *Attorney, Agent, or Firm* — Wenderoth, Lind & Ponack, L.L.P.

(57) ABSTRACT

A video encoding method of performing scalable encoding on input video includes: determining a total number of layers of the scalable encoding to be less than or equal to a maximum layer count determined according to a frame rate; and performing the scalable encoding on the input video to generate a bitstream, using the determined total number of layers.

4 Claims, 38 Drawing Sheets

Related U.S. Application Data continuation of application No. 16/269,964, filed on Feb. 7, 2019, now Pat. No. 10,652,547, which is a continuation of application No. 14/708,322, filed on May 11, 2015, now Pat. No. 10,244,240, which is a continuation of application No. PCT/JP2014/002974, filed on Jun. 4, 2014.

(60) Provisional application No. 61/831,209, filed on Jun. 5, 2013.

(51) Int. Cl.
| | | |
|---|---|---|
| *H04N 19/156* | (2014.01) | |
| *H04N 19/187* | (2014.01) | |
| *H04N 19/31* | (2014.01) | |
| *H04N 19/30* | (2014.01) | |
| *H04N 19/105* | (2014.01) | |
| *H04N 19/154* | (2014.01) | |
| *H04N 19/184* | (2014.01) | |

(52) U.S. Cl.
CPC ......... *H04N 19/154* (2014.11); *H04N 19/156* (2014.11); *H04N 19/184* (2014.11); *H04N 19/187* (2014.11); *H04N 19/30* (2014.11); *H04N 19/31* (2014.11)

(58) Field of Classification Search
USPC ..................................................... 375/240.03
See application file for complete search history.

(56) References Cited

U.S. PATENT DOCUMENTS

| | | |
|---|---|---|
| 2009/0034626 A1 | 2/2009 | Park et al. |
| 2009/0220010 A1 | 9/2009 | Park et al. |
| 2012/0082226 A1* | 4/2012 | Weber ............... H04N 7/141 375/E7.246 |
| 2013/0034170 A1 | 2/2013 | Chen |
| 2015/0063453 A1* | 3/2015 | Kang ............... H04N 19/13 375/240.12 |
| 2015/0245034 A1 | 8/2015 | Terada et al. |
| 2019/0174134 A1 | 6/2019 | Terada et al. |
| 2020/0236364 A1 | 7/2020 | Terada et al. |

FOREIGN PATENT DOCUMENTS

| | | |
|---|---|---|
| JP | 2011-216986 | 10/2011 |
| JP | 6636571 | 1/2020 |
| WO | 2008/030068 | 3/2008 |
| WO | 2012/096806 | 7/2012 |
| WO | 2013/004911 | 1/2013 |

OTHER PUBLICATIONS

Benjamin Bross et al., "High Efficiency Video Coding (HEVC) text specification draft 10 (for FDIS & Last Call)", Joint Collaborative Team on Video Coding (JCT-VC) of ITU-T SG16 WP3 and ISO/IEC JTC1/SC29/WG11 12th Meeting: Geneva, CH, Jan. 14-23, 2013, JCTVC-L1003_v34, http://phenix.it-sudparis.eu/ict/doc_end_user/documents/12_Geneva/wg11/JCTVC-L1003-v34.zip.

"Video Coding, Audio Coding and Multiplexing Specifications for Digital Broadcasting", ARIB Standard, ARIB STD-B32 ver. 2.8, Association of Radio Industries and Businesses, Enactment date; May 31, 2001, Revision date; Dec. 18, 2012 http://www.arib.or.jp/english/html/overview/doc/2-STD-B32v2_8.pdf with partial English translation (p. 81, line 11 to line 15) and English translation of ARIB STD-B32 Version 2.1.

Benjamin Bross et al., "Editors' proposed corrections to HEVC version 1", Joint Collaborative Team on Video Coding (JCTVC) of ITU-T SG16 WP3 and ISO/IEC JTC1/SC29/WG11 13th Meeting: Incheon, KR, Apr. 18-26, 2013, JCTVC-M0432.

Extended European Search Report dated Oct. 10, 2016 in corresponding European Application No. 14807897.5.

Communication pursuant to Article 94(3) EPC dated Jul. 8, 2020 in corresponding European Patent Application No. 14807897.5.

H. Schwarz et al., "Overview of the Scalable Video Coding Extension of the H.264/AVC Standard", IEEE Transactions on Circuits and Systems for Video Technology, vol. 17, No. 9, Sep. 2007, pp. 1103-1120.

Jill Boyce, Danny Hong and Alexandros Eleftheriadis, "High layer syntax to improve support for temporal scalability", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D200, pp. 1-14.

* cited by examiner

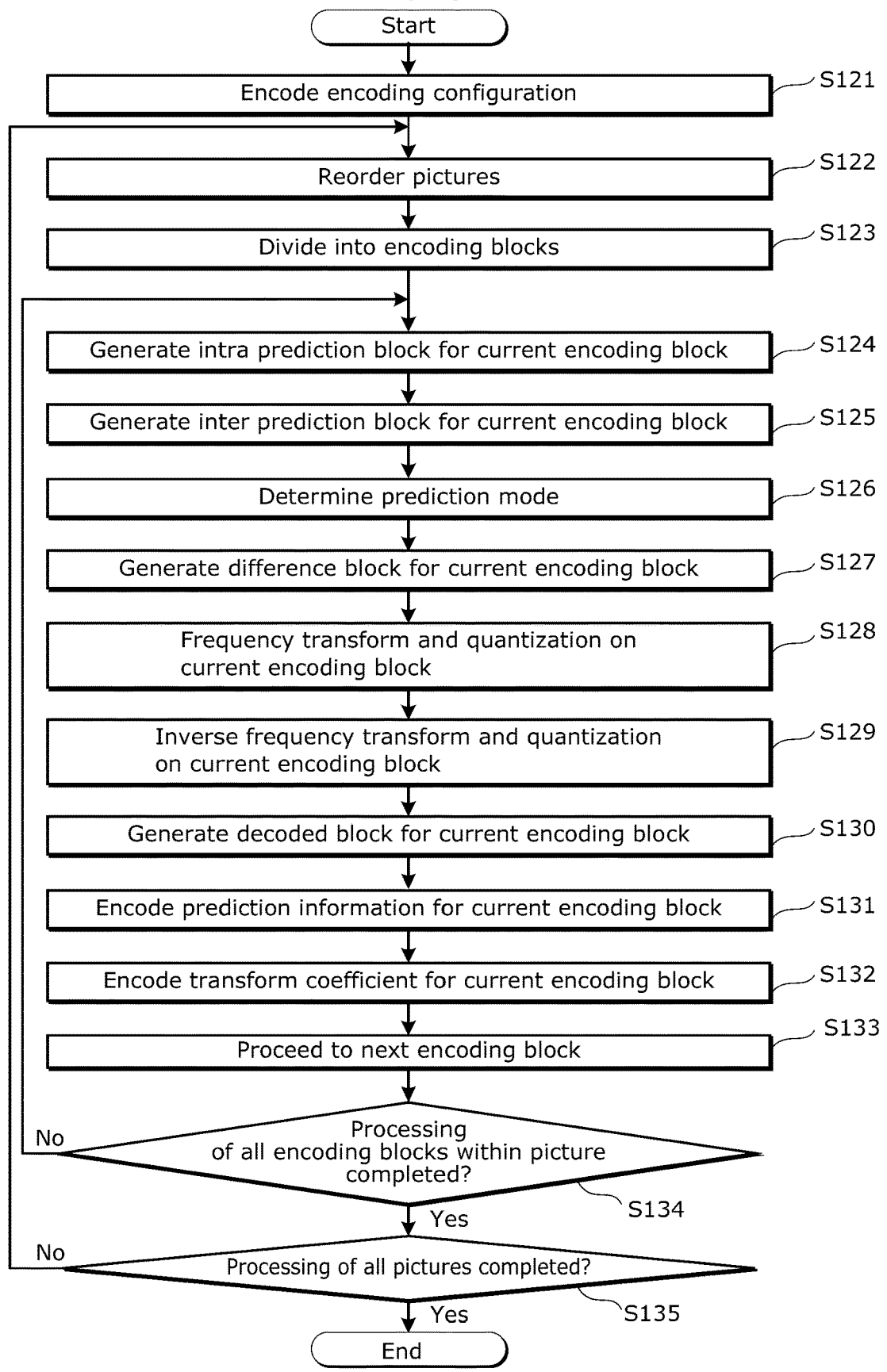

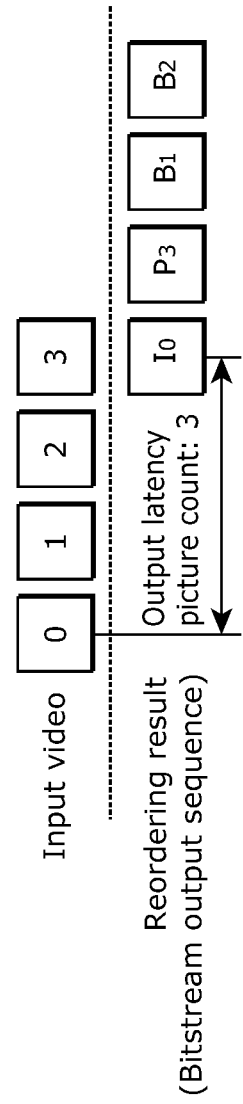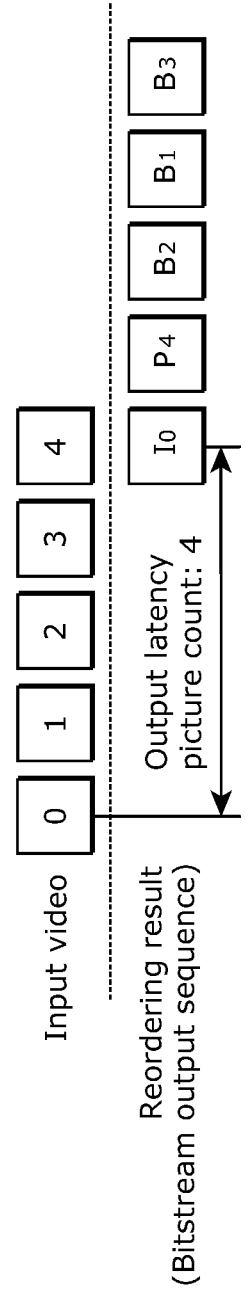

FIG. 10

| | 24 fps | 30 fps | 60 fps | 120 fps |
|---|---|---|---|---|
| Total number of layers sps_max_sub_layers_minus1+1 | 2 | 3 | 4 | 5 |
| Continuous B-picture count (SpsMaxLatencyPictures) ([numerical value] is TemporalId) | 2[1]<br>0[0] | 3[2]<br>1[1]<br>0[0] | 7[3]<br>3[2]<br>1[1]<br>0[0] | 15[4]<br>7[3]<br>3[2]<br>1[1]<br>0[0] |
| Display latency picture count (sps_max_num_reorder_pics) ([numerical value] is TemporalId) | 1[1]<br>0[0] | 2[2]<br>1[1]<br>0[0] | 3[3]<br>2[2]<br>1[1]<br>0[0] | 4[4]<br>3[3]<br>2[2]<br>1[1]<br>0[0] |
| Display latency | 1 / 24 s<br>(0.042 s) | 2 / 30 s<br>(0.067 s) | 3 / 60 s<br>(0.050 s) | 4 / 120 s<br>(0.033 s) |
| Output latency picture count | 3 | 4 | 8 | 16 |
| Output latency | 3 / 24 s<br>(0.125 s) | 4 / 30 s<br>(0.133 s) | 8 / 60 s<br>(0.133 s) | 16 / 120 s<br>(0.133 s) |

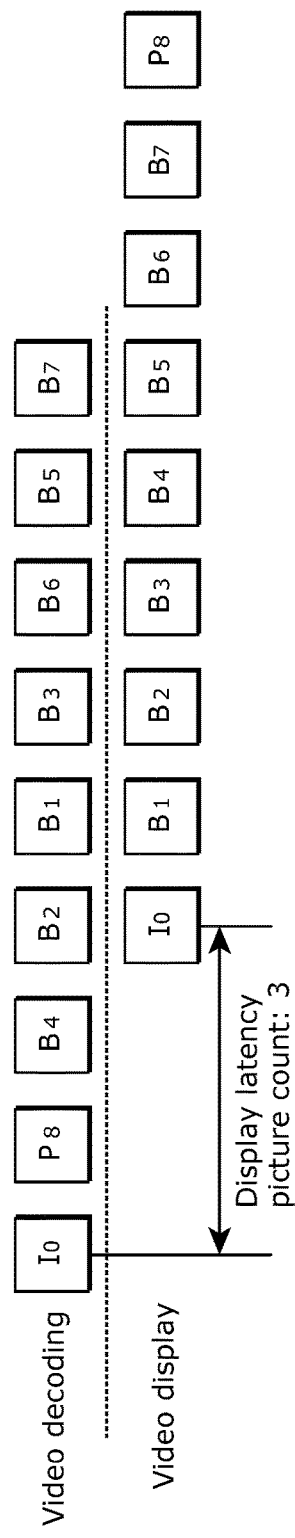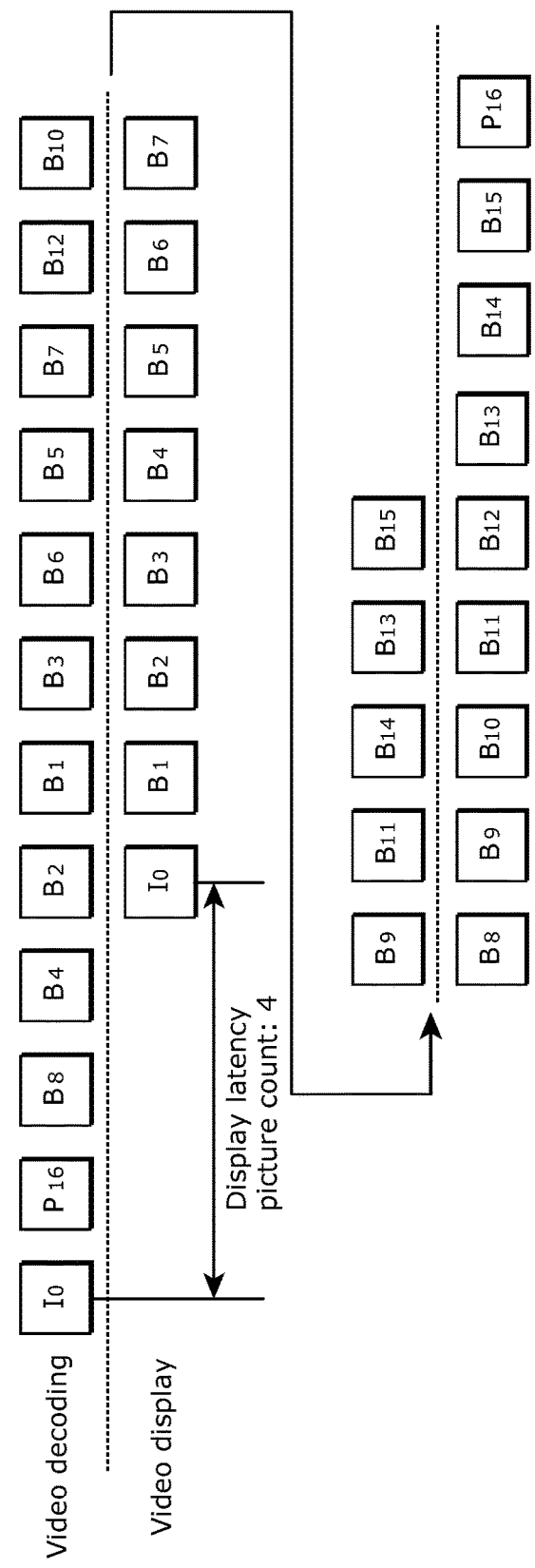
FIG. 12C
FIG. 12D

FIG. 23

| Video stream (PID=0x1011, Primary video) | Audio stream (PID=0x1100) | Audio stream (PID=0x1101) | Presentation graphics stream (PID=0x1200) | Presentation graphics stream (PID=0x1201) | Interactive graphics stream (PID=0x1400) | Video stream (PID=0x1B00, Secondary video) | Video stream (PID=0x1B01, Secondary video) |
|---|---|---|---|---|---|---|---|

FIG. 26
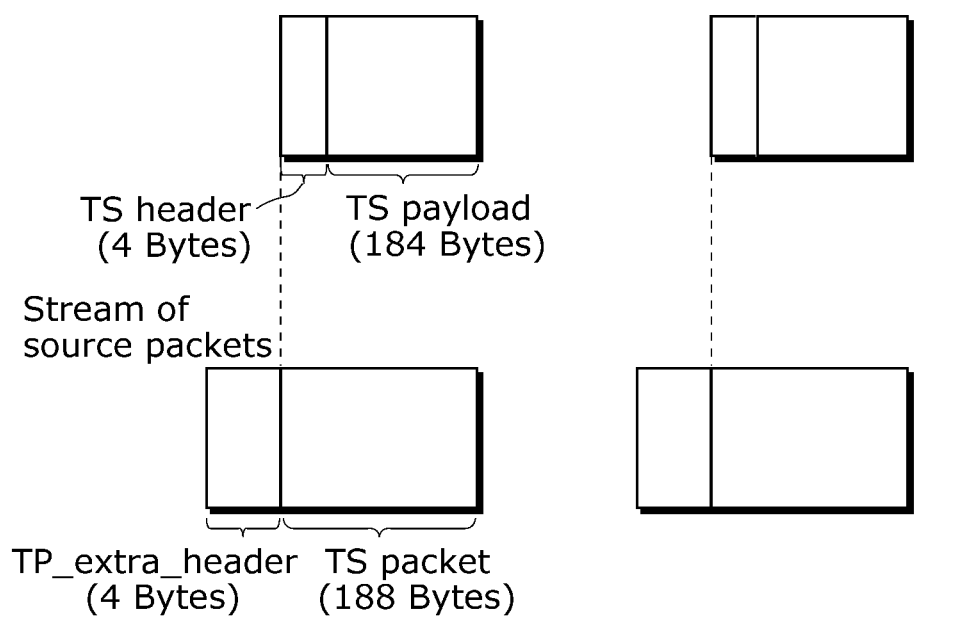
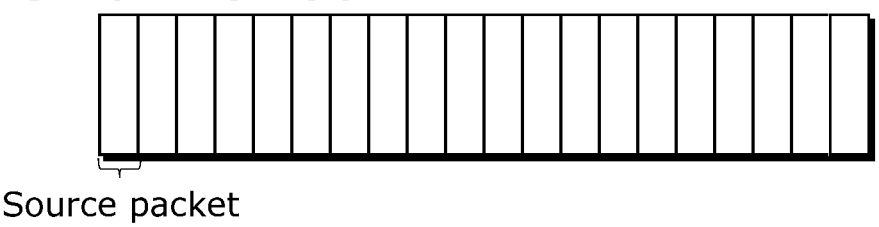

FIG. 34

| Corresponding standard | Driving frequency |
|---|---|
| MPEG-4 AVC | 500 MHz |
| MPEG-2 | 350 MHz |
| ⋮ | ⋮ |

VIDEO ENCODING METHOD, VIDEO DECODING METHOD, VIDEO ENCODING APPARATUS, AND VIDEO DECODING APPARATUS

CROSS REFERENCE TO RELATED APPLICATIONS

This is a continuation of application Ser. No. 16/843,468, filed Apr. 8, 2020, which is a continuation of application Ser. No. 16/269,964, filed Feb. 7, 2019, now U.S. Pat. No. 10,652,547, which is a continuation of application Ser. No. 14/708,322, filed May 11, 2015, now U.S. Pat. No. 10,244,240, which is a continuation application of PCT International Application No. PCT/JP2014/002974 filed on Jun. 4, 2014, designating the United States of America, which is based on and claims priority of U.S. Provisional Patent Application No. 61/831,209 filed on Jun. 5, 2013. The entire disclosures of the above-identified applications, including the specifications, drawings and claims are incorporated herein by reference in their entirety.

FIELD

One or more exemplary embodiments disclosed herein relate to a video encoding method of encoding video or a video decoding method of decoding video.

BACKGROUND

The technique disclosed in Non Patent Literature (NPL) 1 is a technique related to a video encoding method of encoding video (including a moving picture) and a video decoding method of decoding video (including a moving picture). The rule disclosed in NPL 2 is a rule for practice related to encoding and decoding.

CITATION LIST

Non Patent Literature

[NPL 1] Joint Collaborative Team on Video Coding (JCT-VC) of ITU-T SG16 WP3 and ISO/IEC JTC1/SC29/WG11 12th Meeting: Geneva, CH, 14-23 Jan. 2013 JCTVC-L1003_v34.doc, High Efficiency Video Coding (HEVC) text specification draft 10 (for FDIS & Last Call) http://phenix.it-sudparis.eu/jct/doc_end_user/documents/12_Gene va/wg11/JCTVC-L1003-v34.zip

[NPL 2] Association of Radio Industries and Businesses, ARIB Standard STD-B32 Ver. 2.8, 2-STD-B32v2_8.pdf: "Video Coding, Audio Coding and Multiplexing Specifications for Digital Broadcasting" http://www.arib.or.jp/english/html/overview/doc/2-STD-B32v2_8.pdf

SUMMARY

Technical Problem

However, there are cases where ineffective processing is used in a conventional video encoding method or video decoding method.

Thus, one non-limiting and exemplary embodiment provides a video encoding method of efficiently encoding video or a video decoding method of efficiently decoding video.

Solution to Problem

In one general aspect, the techniques disclosed here feature a video encoding method of performing scalable encoding on video, which includes: determining a total number of layers of the scalable encoding to be less than or equal to a maximum layer count determined according to a frame rate of the video; and performing the scalable encoding on the video to generate a bitstream, using the total number of layers determined.

In one general aspect, the techniques disclosed here feature a video decoding method of decoding a bitstream obtained by performing scalable encoding on video, which includes: decoding the video in the bitstream; decoding first information in the bitstream, the first information indicating a total number of layers of the scalable encoding; and reordering, using the total number of layers indicated in the first information, pictures included in the video decoded, and outputting the pictures reordered, wherein the total number of layers is less than or equal to a maximum layer count predetermined according to a frame rate of the bitstream.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Advantageous Effects

One or more exemplary embodiments or features disclosed herein provide a video encoding method by which video can be efficiently encoded or a video decoding method by which video can be efficiently decoded.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a flowchart of an encoding process according to Embodiment 1.

FIG. 9A illustrates an output latency picture count according to Embodiment 1.

FIG. 9B illustrates an output latency picture count according to Embodiment 1.

FIG. 10 illustrates an example of an encoding configuration limit according to Embodiment 1.

FIG. 12C illustrates a display latency picture count according to Embodiment 1.

FIG. 12D illustrates a display latency picture count according to Embodiment 1.

FIG. 23 illustrates a structure of multiplexed data.

FIG. 26 illustrates a structure of TS packets and source packets in the multiplexed data.

FIG. 34 illustrates an example of a look-up table in which video data standards are associated with driving frequencies.

DESCRIPTION OF EMBODIMENTS

Underlying Knowledge Forming Basis of the Present Disclosure

The inventors found that the following problem arises in the video encoding apparatus that encodes video or the video decoding apparatus that decodes video, described in the "Background" section.

Recent years have seen significant technology advancement of digital video devices, leading to increased opportunities for compressing and encoding video signals output from video cameras or television tuners (a plurality of chronologically arranged pictures) and recording resultant encoded signals onto recording media such as digital versatile discs (DVDs) or hard disks.

There has been H. 264/AVC (MPEG-4 AVC) video coding standard. As a next-generation standard, a high efficiency video coding (HEVC) standard has been considered (NPL 1). A rule for practice of the video coding standard has also been considered (NPL 2).

Figure 1:
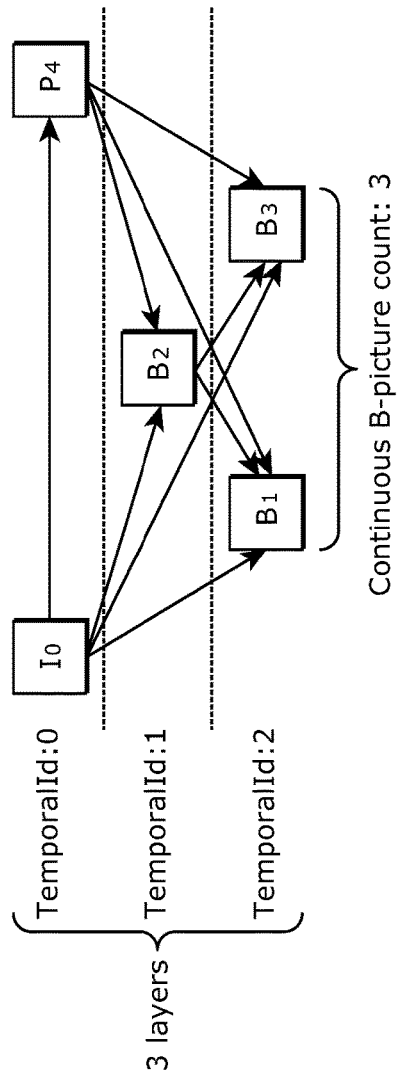
FIG. 1 illustrates an example of an encoding configuration.
Figure 2:
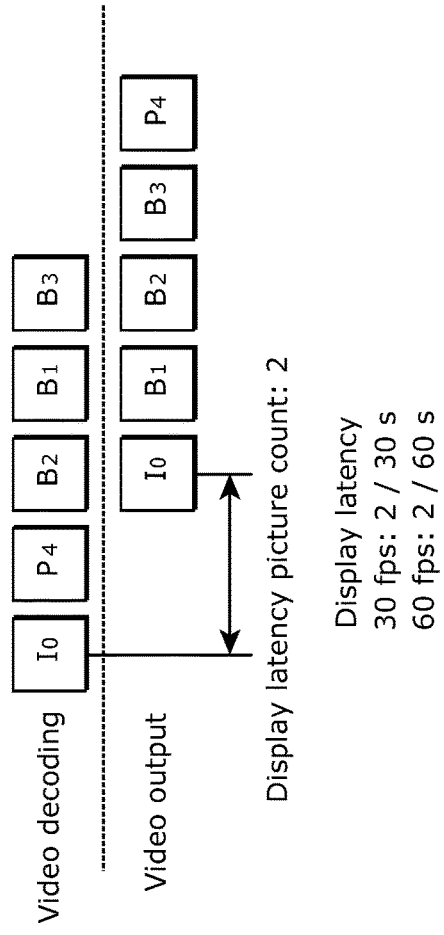
FIG. 2 illustrates a display latency picture count.

In the current rule for practice (NPL 2), the encoding configuration is limited up to three layers as illustrated in FIG. 1, and thus the maximum display latency picture count is limited to two as illustrated in FIG. 2. TemporalId in FIG. 1 is an identifier of a layer in the encoding configuration. TemporalId having a larger value indicates a deeper layer.

Each square block represents a picture; $I_X$ in a block indicates that the block represents an I-picture (an intra-frame prediction picture), $P_X$ in a block indicates that the block represents a P-picture (a forward reference prediction picture), and $B_X$ in a block indicates that the block represents a B-picture (a bi-directional reference prediction picture). The sign $_X$ of $I_X$, $P_X$, and $B_X$ indicates a display order, that is, a place of the corresponding picture in the sequence in which the pictures are displayed.

An arrow between the pictures indicates a reference relationship. For example, a prediction image for a picture $B_1$ is generated using a picture $I_0$, a picture $B_2$, and a picture $P_4$ as reference pictures. The use of a picture having TemporalId larger than TemporalId of a reference source picture as a reference picture is prohibited. Thus, the sequence in which the pictures are decoded is an ascending order of TemporalId as illustrated in FIG. 2, that is, the following order: the picture $I_0$, the picture $P_4$, the picture $B_2$, a picture $B_1$, and a picture $B_3$.

Providing layers allows a bitstream to be given temporal scalability.

For example, in order to obtain 30 frames per second (fps) video from a 60 fps bitstream, the video decoding apparatus decodes only pictures having TemporalId of 0 and TemporalId of 1 illustrated in FIG. 1. By doing so, the video decoding apparatus can obtain 30 fps video. Since decoded video needs to be output without blanks in the sequence, the video decoding apparatus outputs pictures in sequence from the picture $I_0$ after decoding the picture $B_2$. Consequently, the display latency picture count is two. When this count is converted into time, the display latency is $2/30$ seconds where the original frame rate is 30 fps, and the display latency is $2/60$ seconds where the original frame rate is 60 fps.

The use of a configuration having high temporal scalability makes it possible that when a frequency band is crowded or when a video decoding apparatus having low processing capacity performs a decoding process, the video decoding apparatus decodes only pictures in a layer having a small TemporalId and display resultant video. Thus, the versatility is enhanced. However, tolerance to a large number of layers in the configuration presents a problem in that the display latency increases.

Even when the display latency picture count is predetermined as described above, the display latency varies depending on frame rate. When the frame rate is lower (e.g., 24 fps) than a standard frame rate (e.g., 30 fps), the display latency is $2/24$ seconds, that is, longer than $2/30$ seconds that is latency at 30 fps.

According to an exemplary embodiment disclosed herein, a video encoding method of performing scalable encoding on video includes: determining a total number of layers of the scalable encoding to be less than or equal to a maximum layer count determined according to a frame rate of the video; and performing the scalable encoding on the video to generate a bitstream, using the total number of layers determined.

By doing so, the video encoding method makes it possible to increase the number of layers while reducing an increase in the display latency. Thus, in the video encoding method, the video can be efficiently encoded.

For example, the maximum layer count may be less than or equal to four when the frame rate is less than or equal to 60 frames per second (fps).

For example, the maximum layer count may be five when the frame rate is 120 fps.

For example, it may be that the video encoding method further includes: determining a picture type of a picture included in the video, to make a display latency picture count less than or equal to a maximum picture count determined according to the frame rate, the display latency picture count being a total number of decoded pictures waiting for being outputted in a video decoding apparatus, and in the performing, the video is encoded as pictures each having the picture type determined.

For example, in the determining of a picture type, the picture type of the picture may be determined to make a continuous B-picture count less than or equal to a maximum continuous count determined according to the frame rate, the continuous B-picture count being a total number of pictures in a B-picture group that only includes B-pictures.

For example, it may be that the maximum picture count, an encoder output latency from when the video is input to a video encoding apparatus to when the bitstream is output, and the frame rate are defined by Maximum picture count=int(log$_2$(encoder output latency [s]×frame rate [fps])), the maximum continuous count, the encoder output latency, and the frame rate are defined by Maximum continuous count=int(encoder output latency [s]×frame rate [fps]−1), and the maximum layer count, the encoder output latency, and the frame rate are defined by Maximum layer count=int(log$_2$(encoder output latency [s]×frame rate [fps]))+1.

For example, it may be that a maximum picture count [i] in each layer, the encoder output latency, and the frame rate are defined by Maximum picture count [i]=int(log$_2$(encoder output latency [s]×frame rate [fps]/$2^{(n-i)}$)), and a maximum continuous count [i] in each layer, the encoder output latency, and the frame rate are defined by Maximum continuous count [i]=int(encoder output latency [s]×frame rate [fps]/$2^{(n-i)}$−1)

where i is an integer less than or equal to the maximum layer count and represents a layer, and n represents (the maximum layer count−1).

According to an exemplary embodiment disclosed herein, a video decoding method of decoding a bitstream obtained by performing scalable encoding on video includes: decoding the video in the bitstream; decoding first information in the bitstream, the first information indicating a total number of layers of the scalable encoding; and reordering, using the total number of layers indicated in the first information, pictures included in the video decoded, and outputting the pictures reordered, wherein the total number of layers is less than or equal to a maximum layer count predetermined according to a frame rate of the bitstream.

By doing so, the video decoding method makes it possible to decode a bitstream obtained by efficiently encoding video.

For example, the maximum layer count may be less than or equal to four when the frame rate is less than or equal to 60 fps.

For example, the maximum layer count may be five when the frame rate is 120 fps.

For example, it may be that further in the decoding of first information, second information in the bitstream is decoded, the second information indicating a display latency picture count which is a total number of decoded pictures waiting for being outputted in a video decoding apparatus, and in the reordering, the pictures included in the video decoded are reordered using the total number of layers indicated in the first information and the display latency picture count indicated in the second information, and the pictures reordered are output.

For example, it may be that further in the decoding of first information, third information in the bitstream is decoded, the third information indicating a continuous B-picture count which is a total number of pictures in a B-picture group that only includes continuous B-pictures, and in the reordering, the pictures included in the video decoded are reordered using the total number of layers indicated in the first information, the display latency picture count indicated in the second information, and the continuous B-picture count indicated in the third information, and the pictures reordered are output.

For example, it may be that a maximum picture count predetermined according to the frame rate, an encoder output latency from when the video is input to a video encoding apparatus to when the bitstream is output, and the frame rate are defined by Maximum picture count=int(log$_2$(encoder output latency [s]×frame rate [fps])), a maximum continuous count predetermined according to the frame rate, the encoder output latency, and the frame rate are defined by Maximum continuous count=int(encoder output latency [s]×frame rate [fps]−1), and the maximum layer count, the encoder output latency, and the frame rate are defined by Maximum layer count=int(log$_2$(encoder output latency [s]×frame rate [fps]))+1.

For example, it may be that a maximum picture count [i] in each layer, the encoder output latency, and the frame rate are defined by Maximum picture count [i]=int(log$_2$(encoder output latency [s]×frame rate [fps]/$2^{(n-i)}$)), and a maximum continuous count [i] in each layer, the encoder output latency, and the frame rate are defined by Maximum continuous count [i]=int(encoder output latency [s]×frame rate [fps]/$2^{(n-i)}$−1)

where i is an integer less than or equal to the maximum layer count and represents a layer, and n represents (the maximum layer count−1).

According to an exemplary embodiment disclosed herein, a video encoding apparatus that encodes video includes: processing circuitry; and storage accessible from the processing circuitry, wherein using the storage, the processing circuitry performs the video encoding method.

This allows the video encoding apparatus to increase the number of layers while reducing an increase in the display latency. Thus, the video encoding apparatus is capable of efficiently encoding video.

According to an exemplary embodiment disclosed herein, a video decoding apparatus that decodes a bitstream obtained by encoding video includes: processing circuitry; and storage accessible from the processing circuitry, wherein using the storage, the processing circuitry performs the video decoding method.

This allows the video decoding apparatus to decode a bitstream obtained by efficiently encoding video.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, embodiments are specifically described with reference to the Drawings. Each of the embodiments described below shows a specific example. The numerical values, shapes, materials, structural elements, the arrangement and connection of the structural elements, steps, the processing order of the steps etc. shown in the following embodiments are mere examples, and therefore do not limit the scope of the appended Claims and their equivalents. Therefore, among the structural elements in the following embodiments, structural elements not recited in any one of the independent claims representing the broadest concepts are described as arbitrary structural elements.

Embodiment 1

A video encoding apparatus according to the present embodiment increases the number of layers when a frame rate is high. This makes it possible to increase the number of layers while reducing an increase in the display latency.
<Overall Structure>

Figure 3:
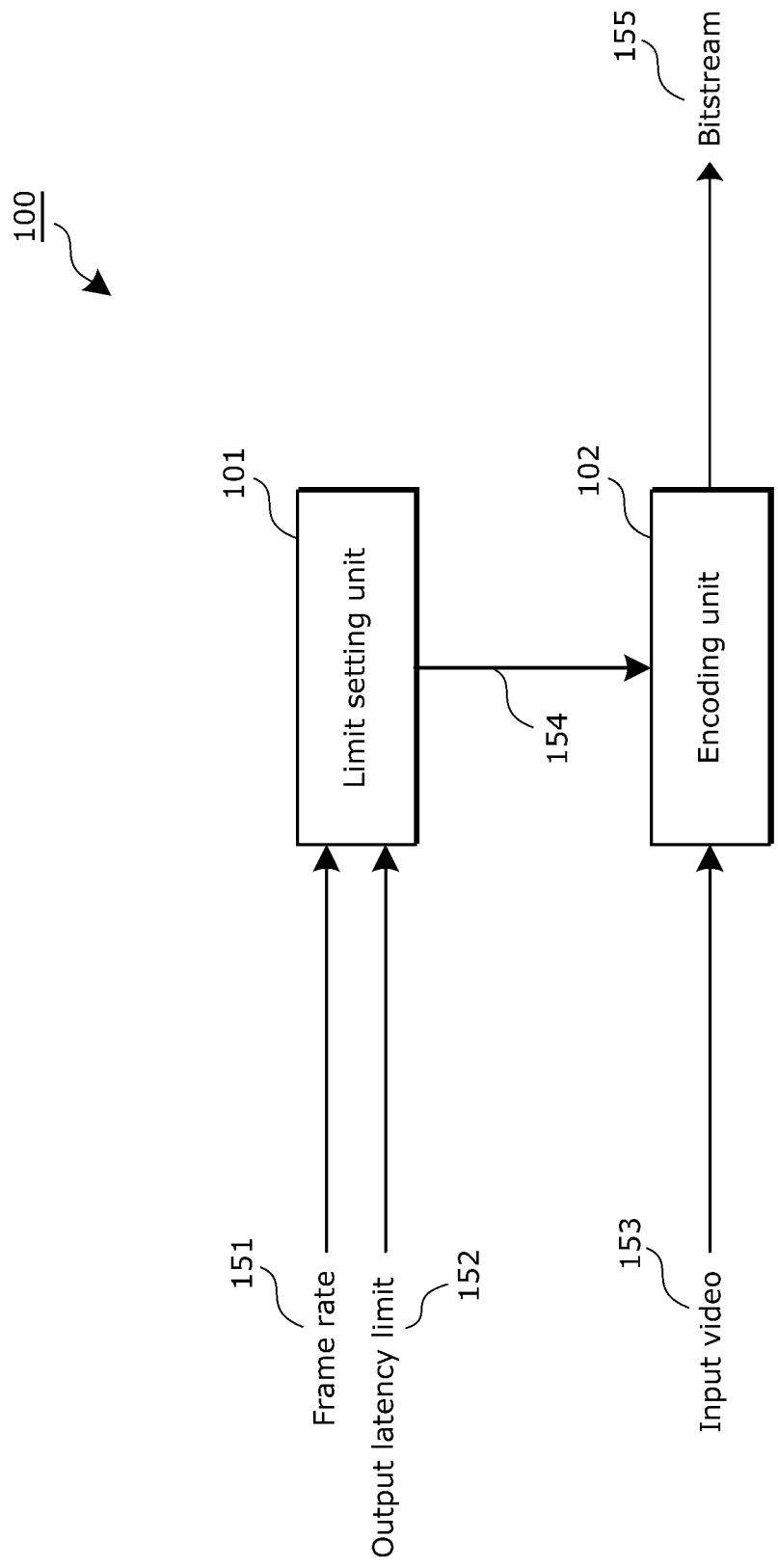
FIG. 3 is a block diagram of a video encoding apparatus according to Embodiment 1.

FIG. 3 is a block diagram illustrating a structure of a video encoding apparatus 100 according to the present embodiment.

The video encoding apparatus 100 illustrated in FIG. 3 generates a bitstream 155 by encoding input video 153. This video encoding apparatus 100 includes a limit setting unit 101 and an encoding unit 102.
<Operation (Overall)>

Figure 4:
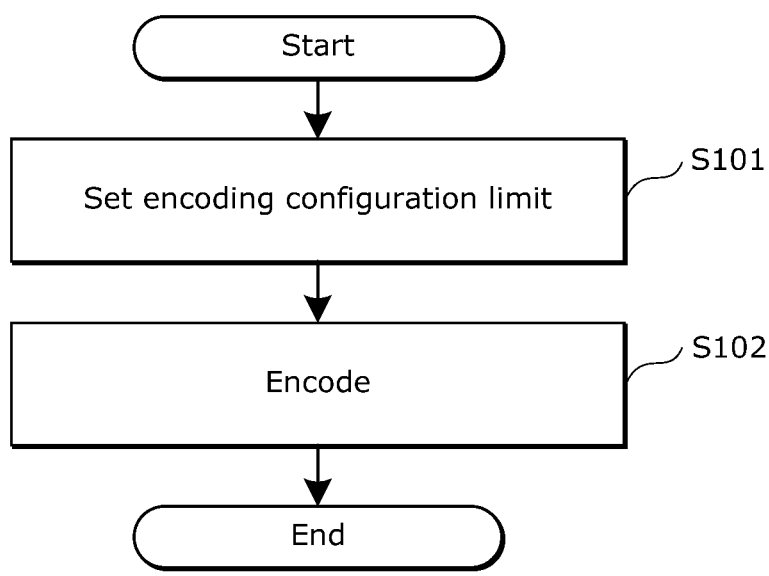
FIG. 4 is a flowchart of a video encoding process according to Embodiment 1.

Next, a flow of an overall encoding process is described with reference to FIG. 4. FIG. 4 is a flowchart of a video encoding method according to the present embodiment.

First, the limit setting unit 101 sets an encoding configuration limit 154 related to an encoding configuration of scalable encoding (S101). Specifically, the limit setting unit 101 sets the encoding configuration limit 154 using a frame rate 151 and an output latency limit 152.

Next, the encoding unit 102 encodes the encoding configuration limit 154 and in addition, encodes the input video 153 using the encoding configuration limit 154, to generate the bitstream 155 (S102).
<Structure of Limit Setting Unit 101>

Figure 5:
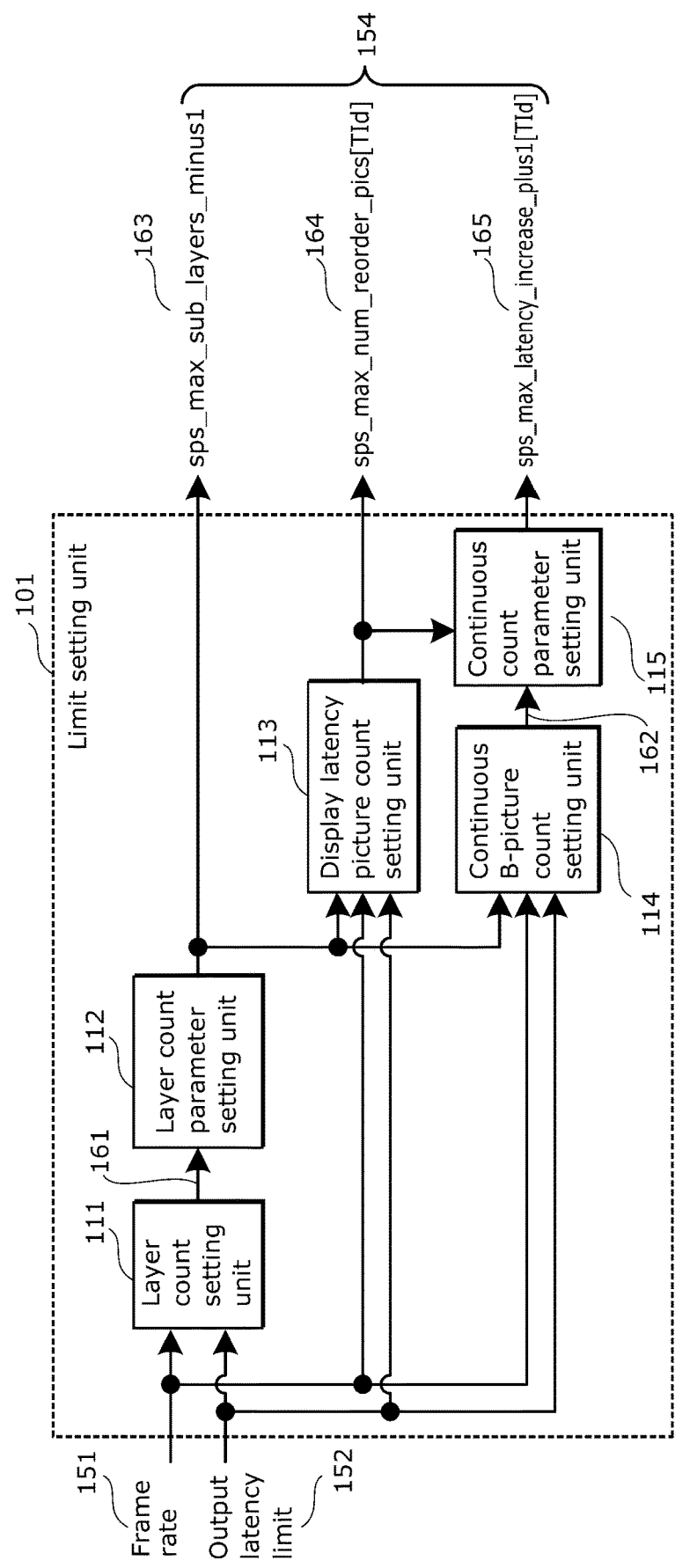
FIG. 5 is a block diagram of a limit setting unit according to Embodiment 1.

FIG. 5 is a block diagram illustrating an example of an internal structure of the limit setting unit 101.

As illustrated in FIG. 5, the limit setting unit 101 includes a layer count setting unit 111, a layer count parameter setting unit 112, a display latency picture count setting unit 113, a continuous B-picture count setting unit 114, and a continuous count parameter setting unit 115.
<Operation (Setting of Encoding Configuration Limit)>

Figure 6:
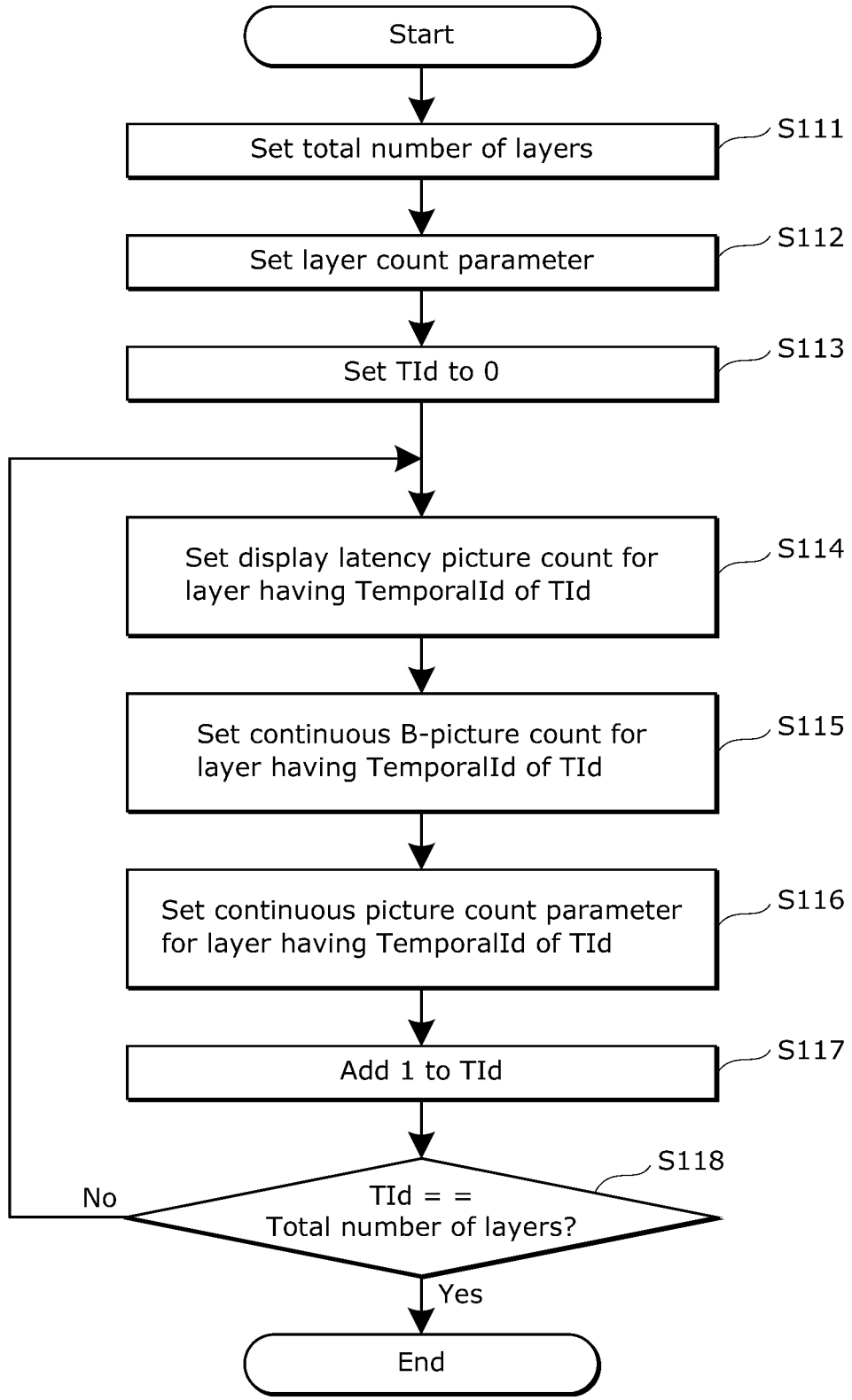
FIG. 6 is a flowchart of a limit setting process according to Embodiment 1.

Next, an example of a limit setting process (S101 in FIG. 4) is described with reference to FIG. 6. FIG. 6 is a flowchart of a limit setting process according to the present embodiment.

First, the layer count setting unit 111 sets the number of layers or a layer count 161 of the encoding configuration using the frame rate 151 and the output latency limit 152 received from outside the video encoding apparatus 100. For example, the layer count 161 is calculated by the following Expression 1 (S111).

Layer count=int($\log_2$(output latency limit [s]×frame rate [fps]))+1     Expression 1

In the above Expression 1, int(x) represents a function that returns an integer to which x is rounded down, and $\log_2(x)$ represents a function that returns a logarithm of x with respect to base 2. The output latency limit 152 indicates a maximum length of time from when the input video 153 is input to the video encoding apparatus 100 to when the bitstream 155 of the input video 153 is output.

Next, using the layer count 161, the layer count parameter setting unit 112 sets a layer count parameter 163, that is, sps_max_sub_layers_minus1 by the following Expression 2 (S112).

sps_max_sub_layers_minus1=Layer count−1     Expression 2

Next, the limit setting unit 101 sets TId to 0 (S113). TId is a variable for identifying a layer and is used to identify a target layer in each process for subsequent layers.

Next, using the frame rate 151, the output latency limit 152, and the layer count parameter 163, the display latency picture count setting unit 113 sets a display latency picture count 164 in a layer having TemporalId of TId (S114). The display latency picture count 164 is the number of pictures counted during a picture decoding process, that is, from a start of decoding a picture to a start of displaying the picture. The display latency picture count 164 is calculated by the following Expression 3.

Display latency picture count in layer having TemporalId of TId=int($\log_2$(output latency limit [s]× frame rate [fps]/$2^{(n-TId)}$))     Expression 3

In the above Expression 3, n represents a maximum TemporalId, that is, a value of sps_max_sub_layers_minus1 calculated in Step S112. The display latency picture count setting unit 113 sets sps_max_num_reorder_pics[TId] to the calculated display latency picture count in the layer having TemporalId of TId.

Next, using the frame rate 151, the output latency limit 152, and the layer count parameter 163, the continuous B-picture count setting unit 114 sets a continuous B-picture count 162 in the layer having TemporalId of TId (S115). The continuous B-picture count 162 is the number of pictures in a B-picture group that only includes continuous B-pictures, and is calculated by the following Expression 4.

Continuous B-picture count in layer having TemporalId of TId=int(output latency limit [s]×frame rate [fps]/$2^{(n-TId)}$−1)  Expression 4

Next, using the continuous B-picture count 162 and the display latency picture count 164 (sps_max_num_reorder_pics[TId]) in the layer having TemporalId of TId, the continuous count parameter setting unit 115 sets a continuous count parameter 165 in the layer having TemporalId of TId (S116). The continuous count parameter 165 in the layer having TemporalId of TId is set by the following Expression 5.

Continuous count parameter in layer having TemporalId of TId=Continuous B-picture count in layer having TemporalId of TId−sps_max_num_reorder_pics[TId]+1  Expression 5

Sps_max_latency_increase_plus1[TId] is set to the calculated continuous count parameter 165.

Next, the limit setting unit 101 adds 1 to TId so as to change a layer to be processed (S117). Steps S114 to S117 are repeated until TId becomes the layer count 161, that is, until processing of all the layers is completed (S118).

Although the limit setting unit 101 herein first sets the layer count 161 and then sets the display latency picture count 164 and the continuous B-picture count 162 in each layer, the setting sequence is not limited to this example.

<Structure of Encoding Unit 102>

Figure 7:
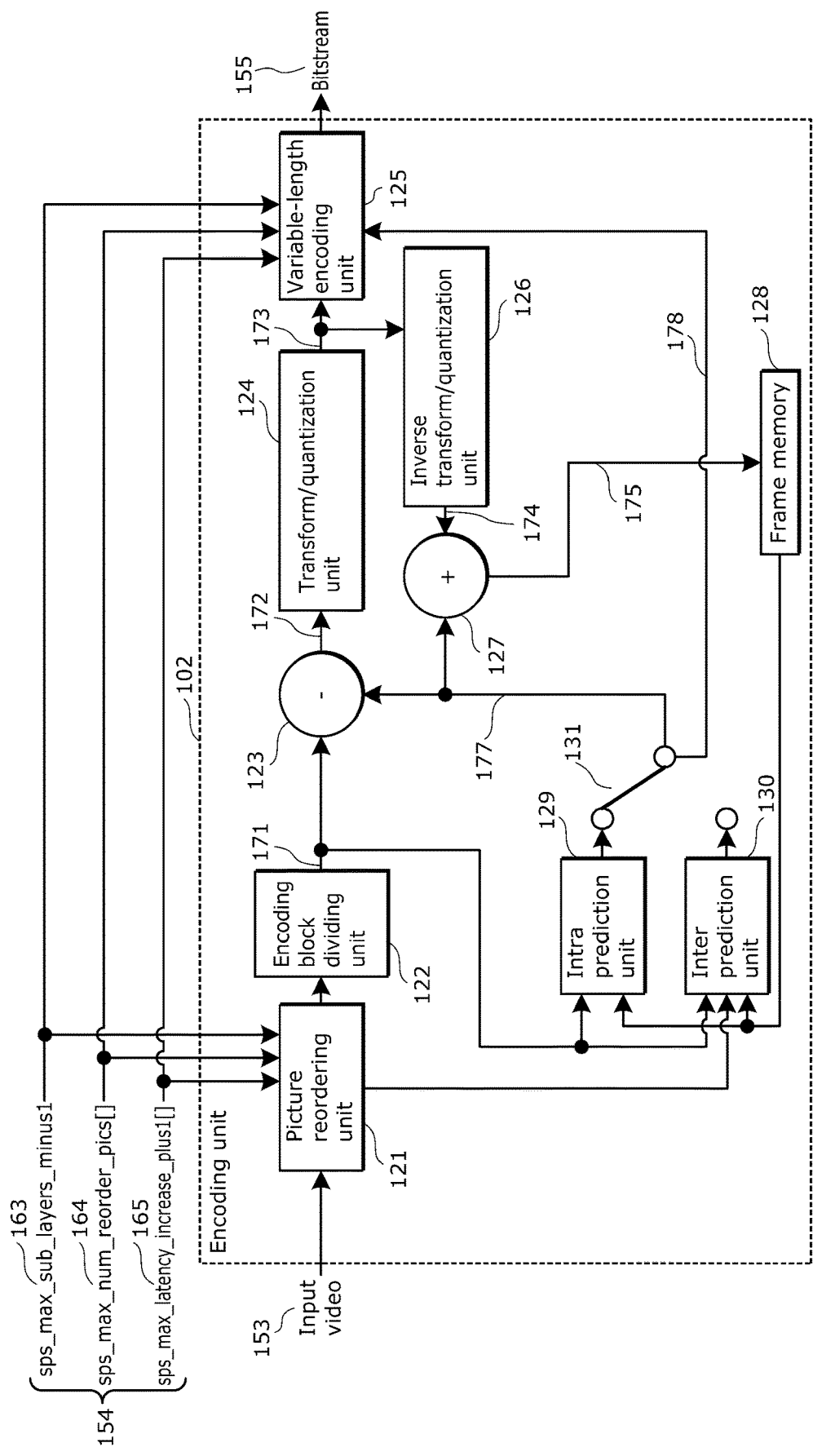
FIG. 7 is a block diagram of an encoding unit according to Embodiment 1.

FIG. 7 is a block diagram illustrating an internal structure of the encoding unit 102. As illustrated in FIG. 7, the encoding unit 102 includes a picture reordering unit 121, an encoding block dividing unit 122, a subtracting unit 123, a transform/quantization unit 124, a variable-length encoding unit 125, an inverse transform/quantization unit 126, an adding unit 127, a frame memory 128, an intra prediction unit 129, an inter prediction unit 130, and a selecting unit 131.

<Operation (Encoding)>

Next, an encoding process according to the present embodiment (S102 in FIG. 4) is described with reference to FIG. 8. FIG. 8 is a flowchart of an encoding process according to the present embodiment.

First, the variable-length encoding unit 125 performs variable-length encoding on sps_max_sub_layers_minus1, sps_max_num_reorder_pics[ ], and sps_max_latency_increase_plus1[ ] set by the limit setting unit 101 (S121). In each layer, sps_max_num_reorder_pics[ ] and sps_max_latency_increase_plus1[ ] are present, all of which the variable-length encoding unit 125 encodes.

Next, the picture reordering unit 121 reorders the input video 153 and determines picture types of the input video 153 according to sps_max_sub_layers_minus1, sps_max_num_reorder_pics[ ], and sps_max_latency_increase_plus1[ ] (S122).

The picture reordering unit 121 performs this reordering process using sps_max_num_reorder_pics[sps_max_sub_layers_minus1] and SpsMaxLatencyPictures. SpsMaxLatencyPictures is calculated by the following Expression 6.

SpsMaxLatencyPictures=sps_max_num_reorder_pics[sps_max_sub_layers_minus1]+sps_max_latency_increase_plus1[sps_max_sub_layers_minus1]−1  Expression 6

FIG. 9A to FIG. 9D each illustrate this reordering process. Since a reordering process such as those illustrated in FIG. 9A to FIG. 9D is performed, the encoding unit 102 cannot start encoding the input video 153 before more than one picture of the input video 153 is input. This means that a lag occurs between input of the first picture of the input video 153 and a start of output of the bitstream 155. This lag is output latency. The above-described output latency limit 152 is a limit for this output latency.

Figure 9C:
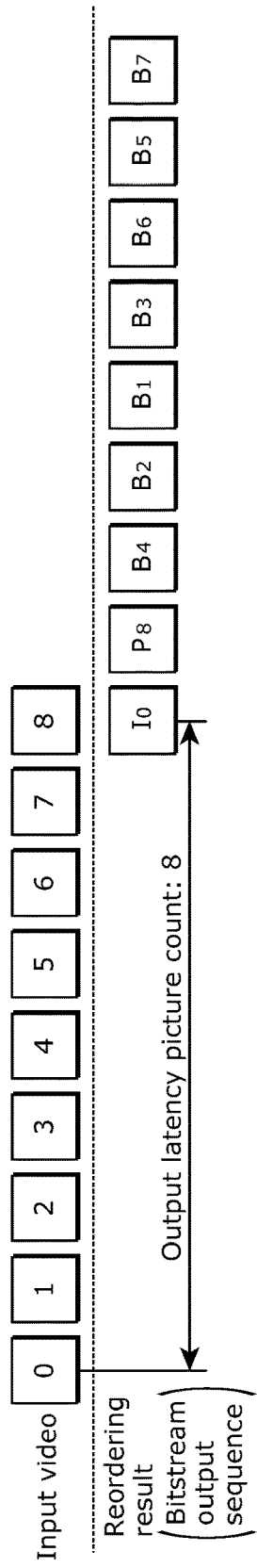
FIG. 9C illustrates an output latency picture count according to Embodiment 1.
Figure 9D:
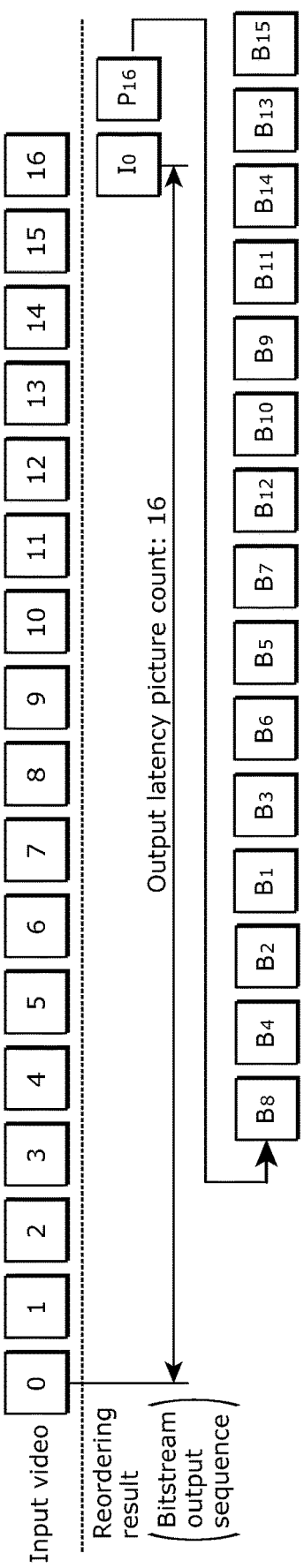
FIG. 9D illustrates an output latency picture count according to Embodiment 1.

Furthermore, FIG. 9A to FIG. 9D represent an output latency picture count corresponding to the encoding configuration limit 154. FIG. 9A represents the output latency picture count determined where sps_max_num_reorder_pics[sps_max_sub_layers_minus1] is 1 and SpsMaxLatencyPictures is 2. FIG. 9B represents the output latency picture count determined where sps_max_num_reorder_pics[sps_max_sub_layers_minus1] is 2 and SpsMaxLatencyPictures is 3. FIG. 9C represents the output latency picture count determined where sps_max_num_reorder_pics[sps_max_sub_layers_minus1] is 3 and SpsMaxLatencyPictures is 7. FIG. 9D represents the output latency picture count determined where sps_max_num_reorder_pics[sps_max_sub_layers_minus1] is 4 and SpsMaxLatencyPictures is 15.

For example, in the case of FIG. 9A, a picture 0, a picture 1, a picture 2, and a picture 3 are input in this sequence to the video encoding apparatus 100, and the video encoding apparatus 100 encodes the video in the following sequence: the picture 0, the picture 3, the picture 1, and the picture 2. The video encoding apparatus 100 needs to seamlessly output the bitstream, and therefore does not start outputting the bitstream until the picture 3 is input. This results in output latency for three pictures between input of the picture 0 and a start of output of the bitstream. Furthermore, the picture reordering unit 121 determines a picture type of each picture, and outputs to the inter prediction unit 130 information indicating which picture is used as a reference picture for the picture. The picture type herein includes I-picture, P-picture, and B-picture.

Next, the encoding block dividing unit 122 divides the input video 153 into encoding blocks 171 (S123).

Next, the intra prediction unit 129 generates a prediction block for intra prediction, and calculates a cost for the prediction block (S124). The inter prediction unit 130 generates a prediction block for inter prediction, and calculates a cost for the prediction block (S125). Using the calculated cost or the like, the selecting unit 131 determines a prediction mode and a prediction block 177 that are to be used (S126).

Next, the subtracting unit 123 calculates a difference between the prediction block 177 and an encoding block 171 to generate a difference block 172 (S127). Next, the transform/quantization unit 124 performs frequency transform and quantization on the difference block 172 to generate a transform coefficient 173 (S128). Next, the inverse transform/quantization unit 126 performs inverse quantization and inverse frequency transform on the transform coefficient 173 to reconstruct a difference block 174 (S129). Next, the adding unit 127 adds the prediction bock 177 and the difference block 174 to generate a decoded block 175 (S130). This decoded block 175 is stored into the frame memory 128 and used in a prediction process by the intra prediction unit 129 and the inter prediction unit 130.

Next, the variable-length encoding unit 125 encodes prediction information 178 indicating a used prediction mode or the like (S131) and encodes the transform coefficient 173 (S132).

The processing then proceeds to a next encoding block (S133), and the encoding unit 102 repeats Steps S124 to S133 until processing of all the encoding blocks within the picture is completed (S134).

Subsequently, the encoding unit 102 repeats Steps S122 to S134 until processing of all the pictures is completed (S135).

<Effects>

As described above, the video encoding apparatus 100 according to the present embodiment determines an encoding configuration using the frame rate 151 and the output latency limit 152. With this, when the frame rate 151 is high, the video encoding apparatus 100 can increase layers without extending display latency of a decoder and output latency of an encoder, and therefore can increase temporal scalability. Furthermore, an increase in the number of B-pictures can lead to an improvement in compression capabilities.

Furthermore, the display latency of the decoder and the output latency of the encoder can be controlled so as not to exceed a designated level even with various frame rates.

This will be described in more details. FIG. 10 represents the layer count 161, the display latency picture count 164, and the continuous B-picture count 162 calculated using the frame rate 151 and the output latency limit 152. In FIG. 10, an example where the output latency limit is 4/30 seconds is shown.

Figure 11A:
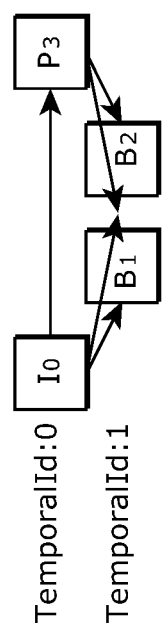
FIG. 11A illustrates an encoding configuration according to Embodiment 1.
Figure 11B:
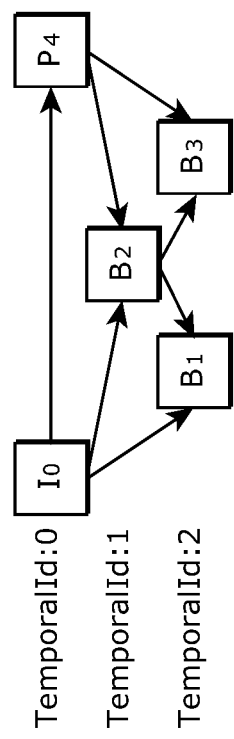
FIG. 11B illustrates an encoding configuration according to Embodiment 1.
Figure 11C:
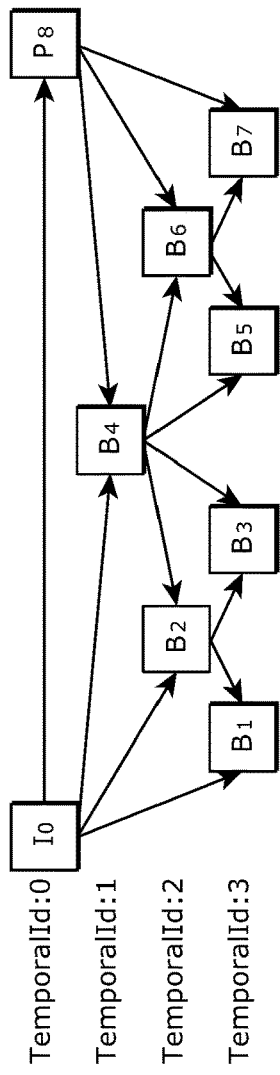
FIG. 11C illustrates an encoding configuration according to Embodiment 1.
Figure 11D:
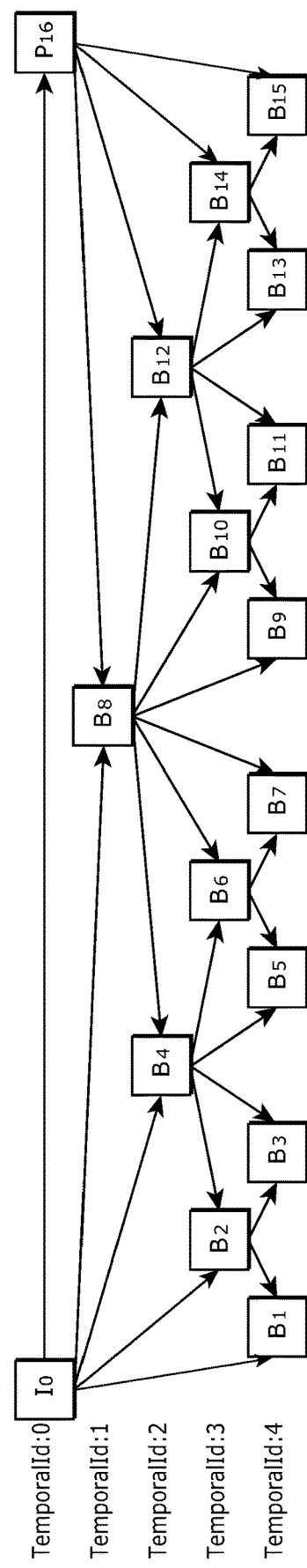
FIG. 11D illustrates an encoding configuration according to Embodiment 1.
Figure 12A:
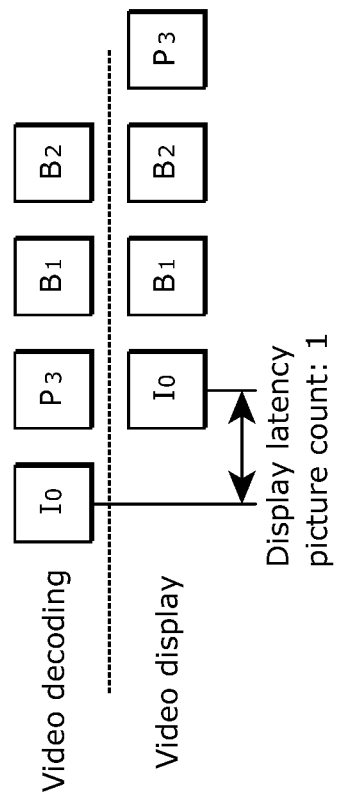
FIG. 12A illustrates a display latency picture count according to Embodiment 1.
Figure 12B:
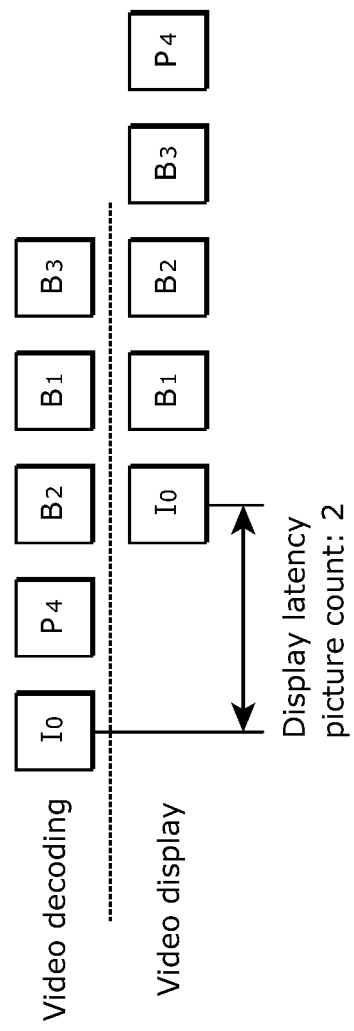
FIG. 12B illustrates a display latency picture count according to Embodiment 1.

FIG. 11A to FIG. 11D each illustrate an encoding configuration formed based on the condition represented in FIG. 10. FIG. 11A illustrates a configuration with a frame rate of 24 fps. FIG. 11B illustrates a configuration with a frame rate of 30 fps. FIG. 11C illustrates a configuration with a frame rate of 60 fps. FIG. 11D illustrates a configuration with a frame rate of 120 fps.

An output latency picture count of the bitstream is represented in FIG. 9A to FIG. 9D where respective frame rates are 24 fps, 30 fps, 60 fps, and 120 fps. FIG. 12A to FIG. 12D illustrate a display latency picture count determined where respective frame rates are 24 fps, 30 fps, 60 fps, and 120 fps.

As illustrated in FIG. 10, the output latency does not exceed the limit, i.e., 4/30 seconds, with all the frame rates. In the current rule for practice (NPL 2), the encoding configuration is limited up to three layers as in FIG. 11B. Specifically, the display latency picture count is limited up to two as in FIG. 12B, and the output latency picture count of the bitstream is limited up to four as in FIG. 9B. With 30 fps, the display latency is 2/30 seconds, and the output latency is 4/30 seconds. In the present embodiment, in the case where the output latency limit has been set to 4/30 seconds, the output latency does not exceed 4/30 seconds, and the display latency does not exceed 2/30 seconds, even when the number of layers is increased or decreased according to the frame rate.

Furthermore, in the present embodiment, the video encoding apparatus 100 determines an encoding configuration using the limit of the output latency rather than the display latency. Thus, when the output latency is used to limit the encoding configuration, it is possible to determine an encoding configuration so that the display latency and the output latency do not exceed 2/30 seconds and 4/30 seconds, respectively, that is, the display latency and the output latency adopted in the current rule for practice (NPL 2). More specifically, in the case where the display latency picture count has been determined so that the display latency does not exceed 2/30 seconds, that is, the display latency in the current rule for practice (NPL 2), when the frame rate is 120 fps, the display latency picture count is eight (8/120 seconds) and an encoding configuration having up to nine layers is permitted. However, in the case where the encoding configuration having nine layers is used, the output latency picture count is 256 (256/120 seconds) which is far beyond the output latency adopted in the current rule for practice (NPL 2), i.e., 4/30 seconds. In contrast, in the case where focus is placed on the output latency, that is, the output latency picture count is determined so that the output latency does not exceed 4/30 seconds, when the frame rate is 120 fps, the output latency picture count is limited to 16 (16/120 seconds), and the encoding configuration is limited up to five layers. In this case, the display latency does not exceed 2/30 seconds. Thus, it is possible to appropriately limit both the output latency and the display latency by limiting the output latency.

Furthermore, the video encoding apparatus 100 sets a limit in each layer for the encoding configuration. With this, even in a video decoding apparatus that decodes only a picture in a layer having a small TemporalId, the display latency can be controlled so as not to exceed designated time.

Although the video encoding apparatus 100 calculates the encoding configuration limit such as the number of layers by the mathematical expression in the above description, it may be that a table illustrated in FIG. 10 is stored in a memory in advance and then, with reference to the table, the video encoding apparatus 100 sets an encoding configuration limit associated with the frame rate 151 and the output latency limit 152. The video encoding apparatus 100 may use both the table and the mathematical expression. For example, the video encoding apparatus 100 may set an encoding configuration limit using the table when the frame rate is not greater than 24 fps, and set an encoding configuration limit using the mathematical expression when the frame rate is greater than 24 fps.

Furthermore, although the video encoding apparatus 100 uses the output latency limit 152 and the frame rate 151 received from outside in the above description, this is not the only example. For example, the video encoding apparatus 100 may use a fixed value predetermined as at least one of the output latency limit 152 and the frame rate 151. Alternatively, the video encoding apparatus 100 may determine at least one of the output latency limit 152 and the frame rate 151 according to an internal state of a buffer memory or the like.

Furthermore, the encoding configurations illustrated in FIG. 11A to FIG. 11D are an example and are not the only example. For example, arrows pointing to reference pictures may be different as long as they meet the condition that a picture having TemporalId larger than TemporalId of a reference source picture be not used as a reference picture; for example, in FIG. 11B, a picture $P_4$ may be used as a reference picture for a picture $B_1$.

The above-described limits for the encoding configuration (the number of layers, the continuous B-picture count, and the display latency picture count) are all maximum values, and therefore values smaller than these limits may be used depending on the situation. As an example, for a frame rate of 30 fps, FIG. 10 represents a total number of layers of 3, a continuous B-picture count of 3[2], and a display latency picture count of 2[2], which correspond to the encoding configuration in FIG. 11B, but the number of layers may be any value not more than 3, and the continuous B-picture count and the display latency picture count may also be any value corresponding to the number of layers not more than 3. For example, it may be possible that the number of layers is 2, the continuous B-picture count is 2[1], and the display latency picture count is 2[2]. In this case, for example, the encoding configuration illustrated in FIG. 11A is used. Accordingly, in Step S121 of encoding an encoding configuration in FIG. 8, information indicating the encoding configuration thus used is encoded.

Furthermore, although sps_max_num_reorder_pics is set to the display latency picture count in the above description, sps_max_num_reorder_pics may be a variable indicating the number of pictures the sequence of which is changed. For example, in the example illustrated in FIG. 9C, a picture 8, a picture 4, and a picture 2 included in input video are reordered and encoded earlier than they are in an input sequence (in a display sequence). In this case, the number of pictures the sequence of which is changed is 3, and sps_max_num_reorder_pics may be set to this value 3.

Furthermore, although sps_max_latency_increase_plus1 is set to the continuous count parameter, and the value of sps_max_num_reorder_pics+sps_max_latency_increase_plus1−1 (SpsMaxLatencyPictures) is treated as the continuous B-picture count in the above description, SpsMaxLatencyPictures may represent a maximum value of a picture decode count which is the number of pictures decoded between when a picture is stored into a buffer after completion of decoding of the picture and when the picture becomes ready to be displayed. For example, in the case of a picture $P_4$ in FIG. 12B, the picture $P_4$ becomes ready to be displayed after three pictures, a picture $B_2$, a picture $B_1$, and a picture $B_3$, are decoded following completion of decoding of the picture $P_4$. The picture $B_2$, the picture $B_3$, and the picture $P_4$ are displayed in sequence. SpsMaxLatencyPictures may be set to this maximum picture decode count, i.e., 3.

Furthermore, although sps_max_num_reorder_pics and sps_max_latency_increase_plus1 are set and encoded for each layer in the present embodiment, this is not the only example. For example, in the case of a system that does not use temporal scalability, only values of sps_max_num_reorder_pics and sps_max_latency_increase_plus1 in the deepest layer (a layer having the largest TemporalId) may be set and encoded.

Although the frame rate in the above description has four variations, 24 fps, 30 fps, 60 fps, and 120 fps, a frame rate other than these variations may be used. Moreover, the frame rate may be a numerical value including a decimal, such as 29.97 fps.

Furthermore, the processing in the present embodiment may be executed by software. This software may be distributed via download or the like. In addition, this software may be recorded on a recording medium such as a compact disc read only memory (CD-ROM) for distribution. Note that this applies to the other embodiments herein.

Embodiment 2

Figure 13:
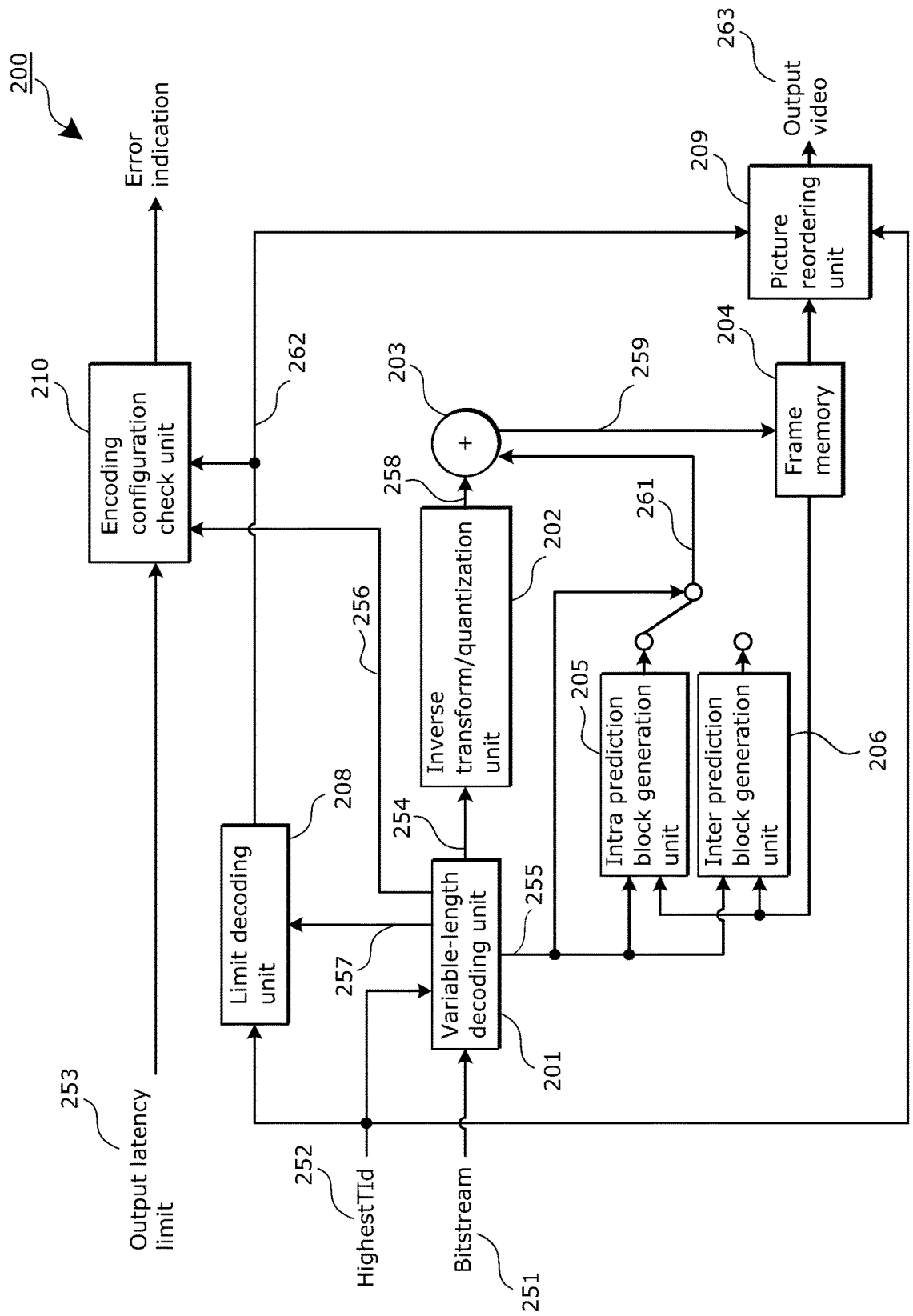
FIG. 13 is a block diagram of a video decoding apparatus according to Embodiment 2.

A video decoding apparatus corresponding to the video encoding apparatus described in Embodiment 1 is described in the present embodiment.
<Overall Structure>
FIG. 13 is a block diagram illustrating a structure of a video decoding apparatus 200 according to the present embodiment.

Figure 14:
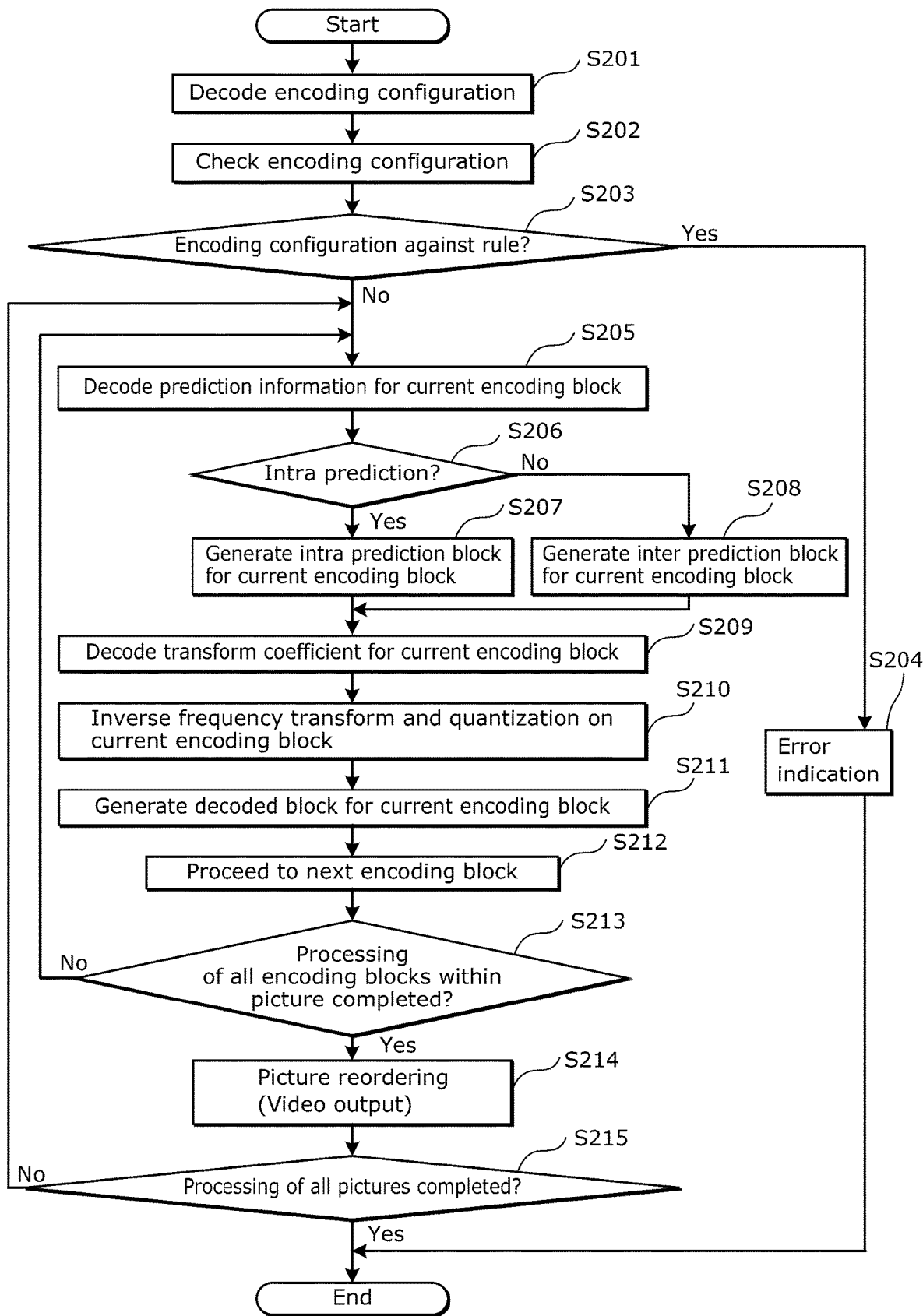
FIG. 14 is a flowchart of a video decoding process according to Embodiment 2.

The video decoding apparatus 200 illustrated in FIG. 13 generates output video 263 by decoding a bitstream 251. The bitstream 251 is, for example, the bitstream 155 generated by the video encoding apparatus 100 in Embodiment 1. This video decoding apparatus 200 includes a variable-length decoding unit 201, an inverse transform/quantization unit 202, an adding unit 203, a frame memory 204, an intra prediction block generation unit 205, an inter prediction block generation unit 206, a limit decoding unit 208, a picture reordering unit 209, and an encoding configuration checking unit 210.
<Operation (Overall)>
Next, a video decoding process according to the present embodiment is described with reference to FIG. 14.

First, the variable-length decoding unit 201 decodes an encoding configuration limit 257 in the bitstream 251. This encoding configuration limit 257 includes sps_max_sub_layers_minus1, sps_max_num_reorder_pics, and sps_max_latency_increase_plus1. The meaning of these pieces of information is the same as in Embodiment 1. Next, the limit decoding unit 208 obtains the number of layers by adding 1 to sps_max_sub_layers_minus1, obtains a continuous B-picture count by a mathematical expression: sps_max_num_reorder_pics+sps_max_latency_increase_plus1−1, and obtains a display latency picture count using sps_max_num_reorder_pics (S201). Furthermore, the limit decoding unit 208 obtains an encoding configuration 262 (a total number of layers, a display latency picture count, and a continuous B-picture count) from sps_max_num_reorder_pics and sps_max_latency_increase_plus1 in a layer having TemporalId corresponding to a value of HighestTId 252 received from outside, and outputs the obtained encoding configuration 262 to the picture reordering unit 209 and the encoding configuration checking unit 210. Here, HighestTId252 represents TemporalId of the highest layer that is decoded.

Next, the encoding configuration checking unit 210 checks if each value of the encoding configuration 262 complies with the rule for practice (S202). Specifically, the encoding configuration checking unit 210 calculates each limit by the following Expression 7 to Expression 9 using an output latency limit 253 received from outside and a frame rate 256 obtained by performing variable-length decoding on the bitstream 251, and determines whether the encoding configuration is not greater than the calculated limit.

$$\text{Layer count}=\text{int}(\log_2(\text{output latency limit [s]}\times\text{frame rate [fps]}))+1 \quad \text{Expression 7}$$

$$\text{Display latency picture count [TId]}=\text{int}(\log_2(\text{output latency limit [s]}\times\text{frame rate [fps]}/2^{(n-TId)})) \quad \text{Expression 8}$$

$$\text{Continuous } B\text{-picture count [TId]}=\text{int}(\text{output latency limit [s]}\times\text{frame rate [fps]}/2^{(n-TId)}-1) \quad \text{Expression 9}$$

When the encoding configuration is greater than the limit (Yes in S203), the encoding configuration checking unit 210 shows an error indication to that effect (S204), and the decoding process ends.

Next, the variable-length decoding unit 201 decodes prediction information 255 indicating a prediction mode in the bitstream 251 (S205). When the prediction mode is intra prediction (Yes in S206), the intra prediction block generation unit 205 generates a prediction block 261 by intra prediction (S207). When the prediction mode is inter prediction (No in S206), the inter prediction block generation unit 206 generates a prediction block 261 by inter prediction (S208).

Next, the variable-length decoding unit 201 decodes a transform coefficient 254 in the bitstream 251 (S209). Next, the inverse transform/quantization unit 202 performs inverse quantization and inverse frequency transform on the transform coefficient 254 to reconstruct a difference block 258 by (S210). Next, the adding unit 203 adds the difference block 258 and the prediction block 261 to generate a decoded block 259 (S211). This decoded block 259 is stored into the frame memory 204 and is used in a prediction block generation process by the intra prediction block generation unit 205 and the inter prediction block generation unit 206.

The video decoding apparatus 200 proceeds to a next encoding block (S212) and repeats Steps S205 to S212 until processing of all the encoding blocks within the picture is completed (S213).

Note that the processing in Steps S205 to S212 is performed on only a picture having TemporalId not larger than HighestTId 252 received from outside.

Next, the picture reordering unit 209 reorders decoded pictures according to the encoding configuration 262 having HighestTId252 layers received from outside, and outputs the reordered decoded pictures as output video 263 (S214).

The video decoding apparatus 200 then repeats Steps S205 to S214 until processing of all the pictures is completed (S215).

<Effects>

As described above, the video decoding apparatus 200 according to the present embodiment can decode the bitstream generated by efficient encoding. Furthermore, the video decoding apparatus 200 can check if the encoding configuration complies with the rule for practice, and when the encoding configuration does not comply with the rule, stop the decoding process and show an error indication.

The video decoding apparatus 200 is controlled to decode, according to HighestTId252 received from outside, only a picture in a layer having HighestTId252 or less in the above description, but this is not the only example. The video decoding apparatus 200 may always decode pictures in all layers. Alternatively, the video decoding apparatus 200 may always decode, using a fixed value predetermined as HighestTId252, only a picture in a layer not higher than a predetermined layer having HighestTId252.

Although the video decoding apparatus 200 checks whether or not the encoding configuration 262 complies with the rule for practice in the above description, this function is not essential; the encoding configuration 262 does not need to be checked.

Although the video decoding apparatus 200 uses the output latency limit 253 received from outside in the above description, a fixed value predetermined as the output latency limit 253 may be used.

Other features are the same as those in Embodiment 1 and therefore are omitted.

Note that the sequence in each flow is not limited to that described above as with the encoding side.

Figure 15:
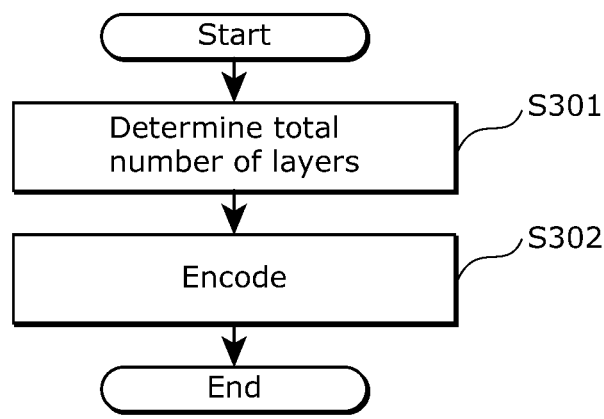
FIG. 15 is a flowchart of a video encoding method according to Embodiment 1.

As described above in Embodiment 1 and Embodiment 2, the video encoding apparatus 100 according to Embodiment 1 is a video encoding apparatus that performs scalable encoding on the input video 153 to generate the bitstream 155 (the bitstream), and performs the processing illustrated in FIG. 15.

First, the video encoding apparatus 100 determines the layer count 161 of the scalable encoding so that the layer count 161 is not greater than a maximum layer count predetermined according to the frame rate (S301). The maximum layer count herein is the layer count represented in FIG. 10; for example, the maximum layer count is two with a frame rate of 24 fps, three with a frame rate of 30 fps, four with a frame rate of 60 fps, and five with a frame rate of 120 fps. In other words, the maximum layer count is more than or equal to four when the frame rate is more than or equal to 60 fps. The maximum layer count is less than or equal to four when the frame rate is less than or equal to 60 fps. The maximum layer count is more than three when the frame rate is greater than 30 fps.

Furthermore, the video encoding apparatus 100 determines picture types of the input video 153 so that the display latency picture count 164 is not more than a maximum picture count predetermined according to the frame rate. The display latency picture count 164 herein is the number of pictures counted during a decoding process performed by a video decoding apparatus to decode the bitstream 155 generated by the video encoding apparatus 100, that is, from when the video decoding apparatus starts decoding a picture and to when the video decoding apparatus outputs (decodes) the picture. The picture types include I-picture, P-picture, and B-picture. The maximum picture count herein is the display latency picture count represented in FIG. 10; for example, the maximum picture count is one with a frame rate of 24 fps, two with a frame rate of 30 fps, three with a frame rate of 60 fps, and four with a frame rate of 120 fps. In other words, the maximum picture count is more than or equal to three when the frame rate is more than or equal to 60 fps. The maximum picture count is less than or equal to three when the frame rate is less than or equal to 60 fps. The maximum picture count is more than two when the frame rate is more than 30 fps.

Furthermore, the video encoding apparatus 100 determines picture types of the input video 153 so that the continuous B-picture count 162 which is the number of continuous B-pictures is not more than a maximum continuous count predetermined according to the frame rate. The maximum continuous count herein is the continuous B-picture count represented in FIG. 10; for example, the maximum continuous count is two with a frame rate of 24 fps, three with a frame rate of 30 fps, seven with a frame rate of 60 fps, and 15 with a frame rate of 120 fps. In other words, the maximum continuous count is more than or equal to seven when the frame rate is more than or equal to 60 fps. The maximum continuous count is less than or equal to seven when the frame rate is less than or equal to 60 fps. The maximum continuous count is more than three when the frame rate is greater than 30 fps.

The video encoding apparatus 100 may determine the maximum layer count, the maximum picture count, and the continuous B-picture count according to the frame rate as illustrated in FIG. 10. Specifically, the video encoding apparatus 100 may set the maximum layer count, the maximum picture count, and the continuous B-picture count to larger values with a higher frame rate.

As described above, the layer count 161, the display latency picture count 164, and the continuous B-picture count 162 are calculated by the above Expression 1, Expression 3, and Expression 4 using the frame rate 151 and the output latency limit 152. Specifically, the maximum picture count, an encoder output latency (output latency) from when the input video 153 is input to the video encoding apparatus 100 to when the bitstream 155 is output, and the frame rate are defined by the following relationship.

Maximum picture count=int(log$_2$(encoder output latency [s]×frame rate [fps]))

The maximum continuous count, the encoder output latency, and the frame rate are defined by the following relationship.

Maximum continuous count=int(encoder output latency [s]×frame rate [fps]−1)

The maximum layer count, the encoder output latency, and the frame rate are defined by the following relationship.

Maximum layer count=int(log$_2$(encoder output latency [s]×frame rate [fps]))+1

The maximum picture count [i] in each layer, the encoder output latency, and the frame rate are defined by the following relationship.

Maximum picture count [i]=int(log$_2$(encoder output latency [s]×frame rate [fps]/2$^{(n-i)}$))

The maximum continuous count [i] in each layer, the encoder output latency, and the frame rate are defined by the following relationship.

Maximum continuous count [i]=int(encoder output latency [s]×frame rate [fps]/2$^{(n-i)}$−1)

Here, i is an integer less than or equal to the maximum layer count and represents a layer, and n represents (the maximum layer count−1).

Next, using the determined layer count 161 and picture types, the video encoding apparatus 100 performs scalable encoding on the input video 153 to generate the bitstream 155 (S302). The video encoding apparatus 100 encodes first information (sps_max_sub_layers_minus1), second information (sps_max_num_reorder_pics), and third information (sps_max_latency_increase_plus1) indicating the determined layer count 161, display latency picture count 164, and continuous B-picture count 162.

Figure 16:
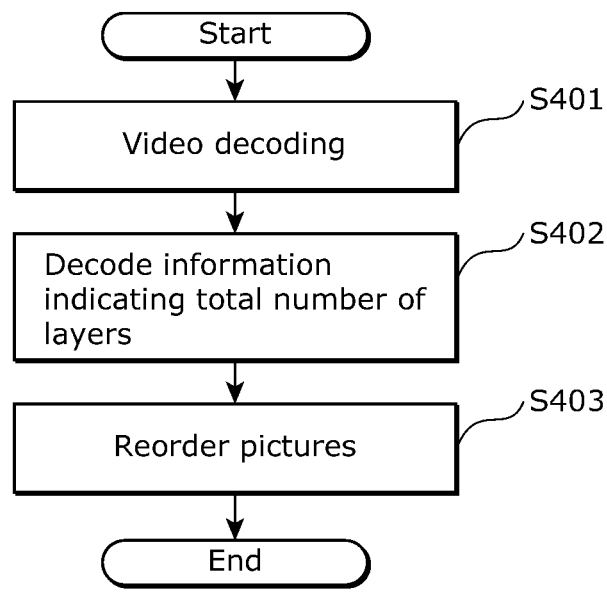
FIG. 16 is a flowchart of a video decoding method according to Embodiment 2.

The video decoding apparatus 200 according to Embodiment 2 is a video decoding apparatus that decodes the bitstream 251 (the bitstream) obtained by performing scalable encoding on video, to generate the output video 263, and performs the processing illustrated in FIG. 16.

First, the video decoding apparatus 200 decodes video in the bitstream 251 (S401).

Next, the video decoding apparatus 200 decodes the first information (sps_max_sub_layers_minus1) in the bitstream 251 that indicates the number of layers of the scalable encoding (S402). For example, this number of layers is not greater than the maximum layer count predetermined according to the frame rate of the bitstream 251.

Furthermore, the video decoding apparatus 200 decodes the second information (sps_max_num_reorder_pics) in the bitstream 251 that indicates the display latency picture count. Moreover, the video decoding apparatus 200 decodes the third information (sps_max_latency_increase_plus1) in the bitstream 251 that indicates the continuous B-picture count.

Next, the video decoding apparatus 200 reorders and outputs pictures included in the decoded video using the number of layers indicated in the first information, the display latency picture count indicated in the second information, and the continuous B-picture count indicated in the third information (S403).

Note that a specific example and a limit of the maximum layer count which is a maximum value of the number of layers, the maximum picture count which is a maximum value of the display latency picture count, and the maximum continuous count which is a maximum value of the continuous B-picture count are the same as those in the video encoding apparatus 100. The relationships between (i) the maximum layer count, the maximum picture count, and the maximum continuous count, and (ii) the frame rate and the encoder output latency are the same as those in the video encoding apparatus 100.

The herein disclosed subject matter is to be considered descriptive and illustrative only, and the appended Claims are of a scope intended to cover and encompass not only the particular embodiments disclosed, but also equivalent structures, methods, and/or uses.

Moreover, the processing units included in the video decoding apparatus and the video encoding apparatus according to the above embodiments are typically implemented as an LSI which is an integrated circuit. These processing units may be individually configured as single chips or may be configured so that a part or all of the processing units are included in a single ship.

Furthermore, the method of circuit integration is not limited to LSIs, and implementation through a dedicated circuit or a general purpose processor is also possible. A Field Programmable Gate Array (FPGA) which allows programming after LSI manufacturing or a reconfigurable processor which allows reconfiguration of the connections and settings of the circuit cells inside the LSI may also be used.

Each of the structural elements in each of the above-described embodiments may be configured in the form of an exclusive hardware product, or may be realized by executing a software program suitable for the structural element. Each of the structural elements may be realized by means of a program executing unit, such as a CPU or a processor, reading and executing the software program recorded on a recording medium such as a hard disk or a semiconductor memory.

In other words, each of the video decoding apparatus and the video encoding apparatus includes processing circuitry and storage electrically connected to the processing circuitry (accessible from the processing circuitry). The processing circuitry includes at least one of the dedicated hardware and the program executing unit. In addition, when the processing circuitry includes the program executing unit, the storage stores a software program executed by the program executing unit. Using the storage, the processing circuitry performs the video decoding method or the video encoding method according to the above embodiment.

Moreover, each of the structural elements in each of the above-described embodiments may be realized by executing the software program, or a non-transitory computer-readable recording medium on which the program is recorded. Furthermore, it goes without saying that the program can be distributed via a transmission medium such as the Internet.

Moreover, all numerical figures used in the foregoing description are merely exemplified for describing the exemplary embodiments in specific terms, and thus the scope of the appended Claims and their equivalents are not limited to the exemplified numerical figures.

Furthermore, the separation of the functional blocks in the block diagrams is merely an example, and plural functional blocks may be implemented as a single functional block, a single functional block may be separated into plural functional blocks, or part of functions of a functional block may be transferred to another functional block. In addition, the functions of functional blocks having similar functions may be processed, in parallel or by time-sharing, by single hardware or software.

Moreover, the sequence in which the steps included in the video decoding method and the video encoding method are executed is given as an example to describe the exemplary embodiments in specific terms, and thus other sequences are possible. Furthermore, part of the steps may be executed simultaneously (in parallel) with another step.

The processing described in the above embodiments may be concentrated processing using a single device (system) or may be distributed processing using more than one device. The above program may be executed by one computer or more than one computer. In other words, the concentrated processing may be performed, or the distributed processing may be performed.

The exemplary embodiments disclosed herein are effective particularly in, for example, a broadcast for many end users with receiving terminals having various functions. For example, a signal having the above-described data structure is broadcast. A 4k2k television or the like terminal is capable of decomposing full-layer data. A smartphone is capable of decomposing up to two-layer data. A transmitting apparatus is capable of transmitting data only in a high-order layer rather than data in all the layers depending on the band congestion situation. This enables flexible broadcast and communication.

The herein disclosed subject matter is to be considered descriptive and illustrative only, and the appended Claims are of a scope intended to cover and encompass not only the particular embodiments disclosed, but also equivalent structures, methods, and/or uses.

Embodiment 3

The processing described in each of embodiments can be simply implemented in an independent computer system, by recording, in a recording medium, one or more programs for implementing the configurations of the moving picture encoding method (video encoding method) and the moving picture decoding method (video decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (video encoding method) and the moving picture decoding method (video decoding method) described in each of embodiments and systems using thereof will be described. The system has a feature of having a video coding apparatus that includes a video encoding apparatus using the video encoding method and a video decoding apparatus using the video decoding method. Other configurations in the system can be changed as appropriate depending on the cases.

Figure 17:
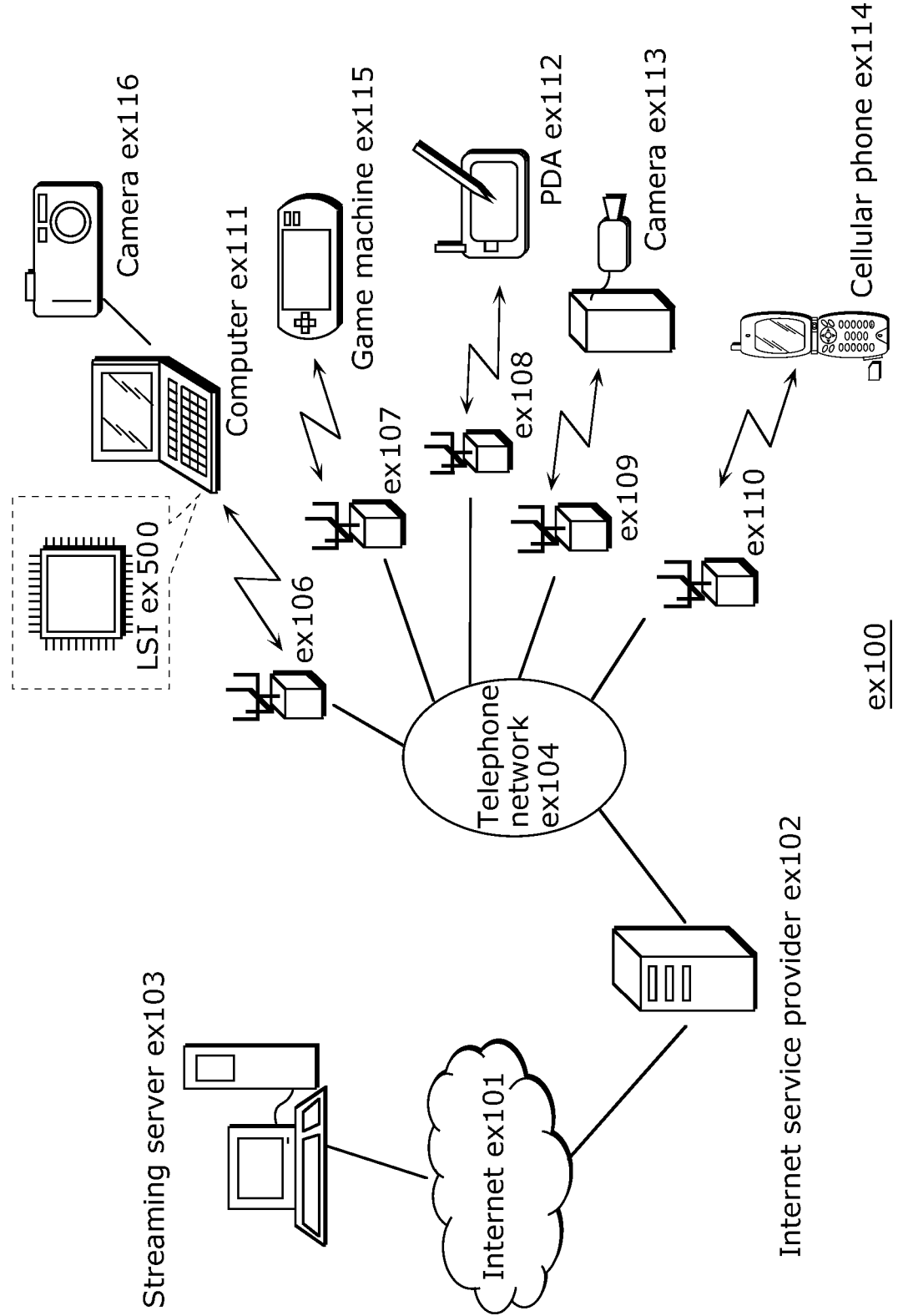
FIG. 17 illustrates an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the video encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the video decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
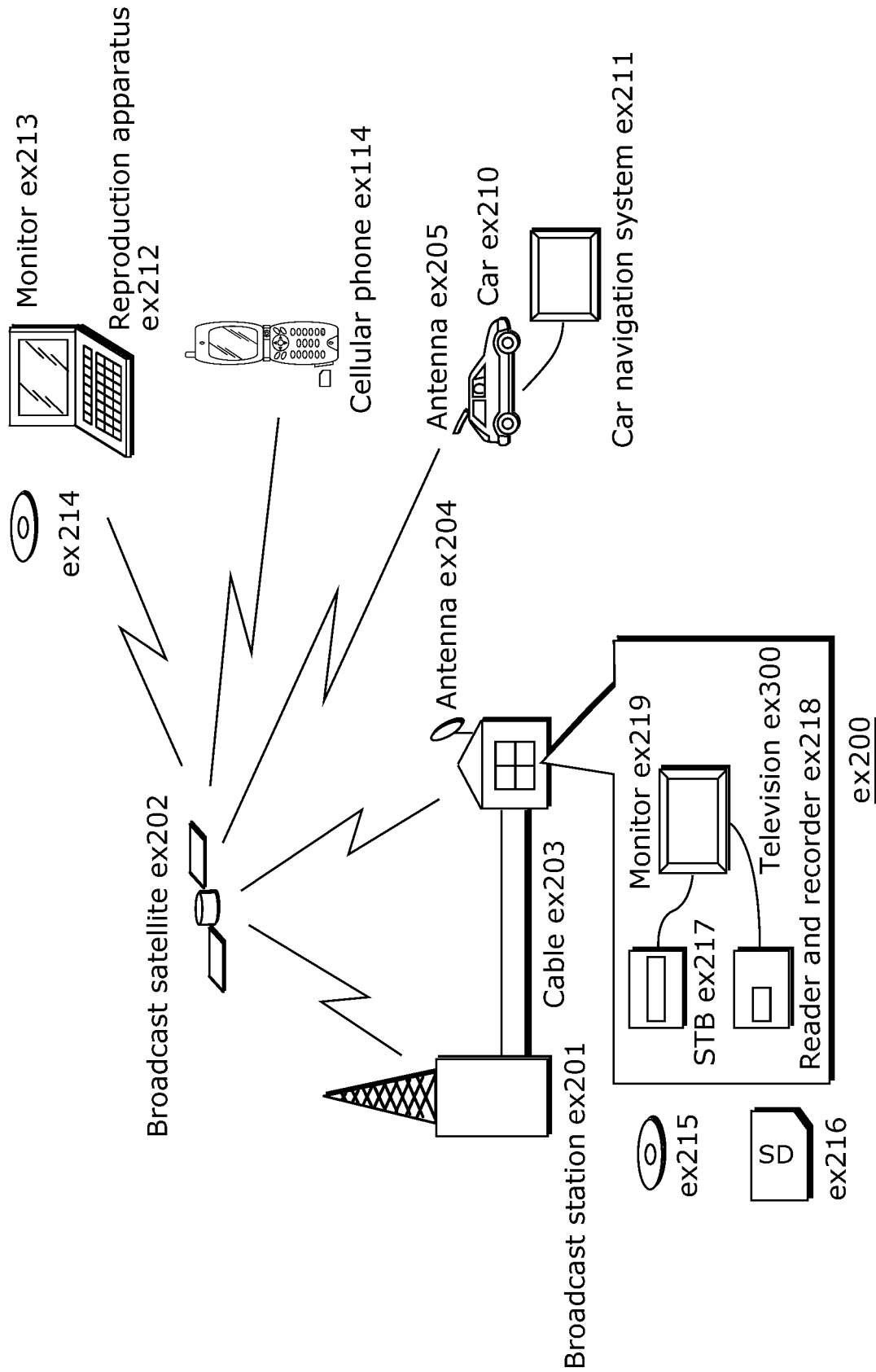
FIG. 18 illustrates an overall configuration of a digital broadcasting system.

Aside from the example of the content providing system ex100, at least one of the moving picture coding apparatus (video coding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the video encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the video decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
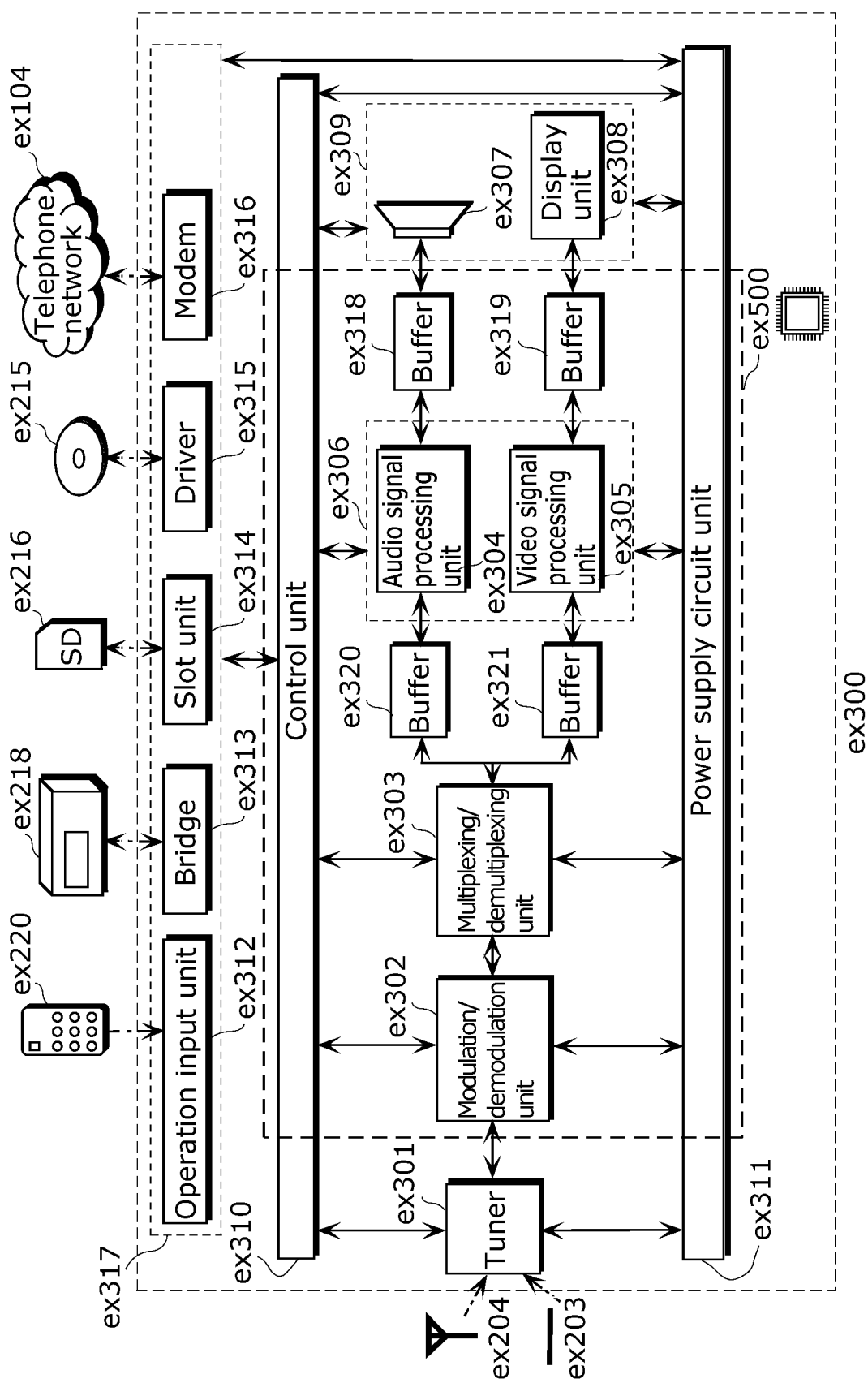
FIG. 19 is a block diagram illustrating an example of a configuration of a television.

FIG. 19 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the video coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 20:
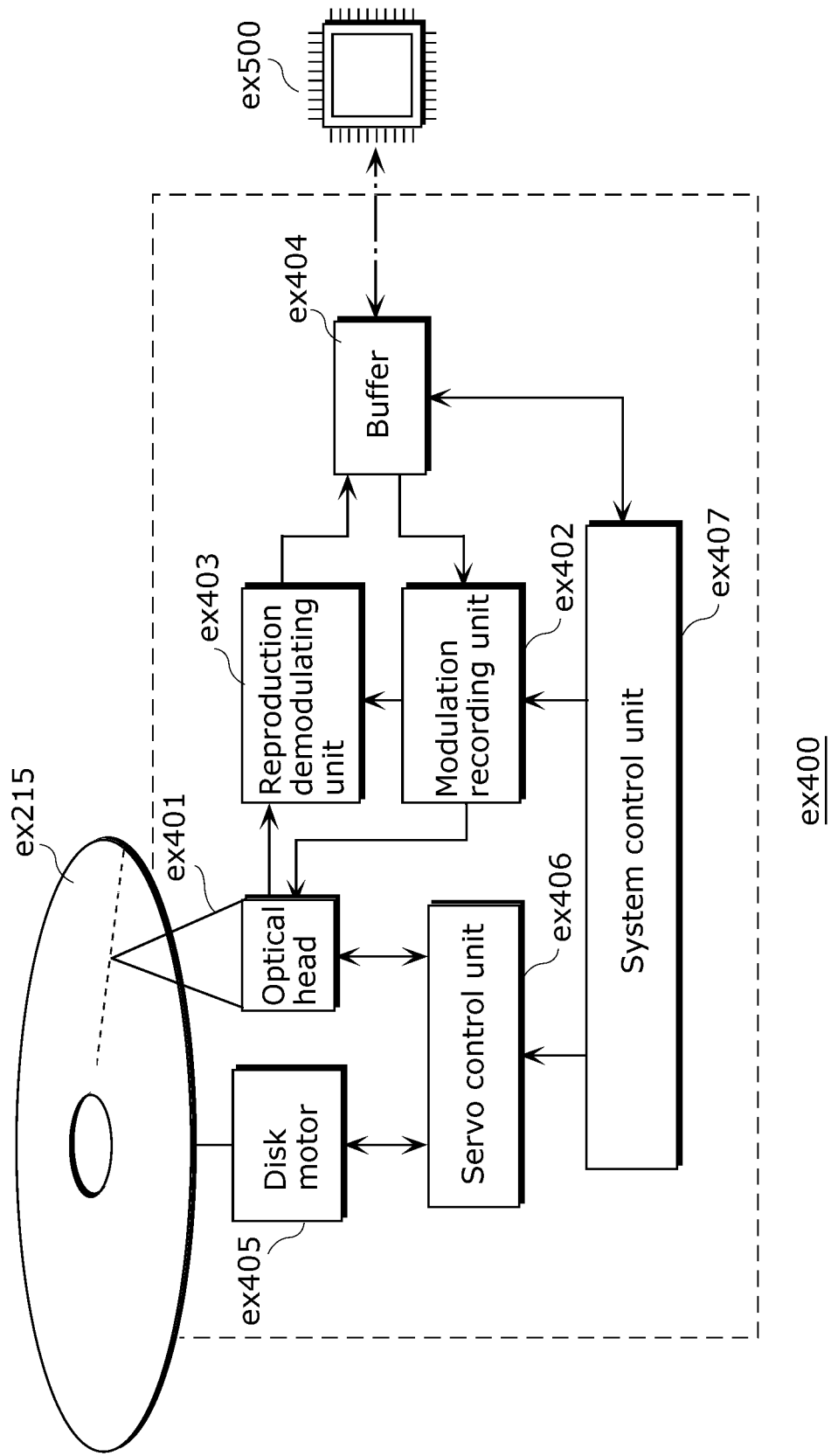
FIG. 20 is a block diagram illustrating an example of a configuration of an information reproducing/recording unit that reads and writes information from and on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
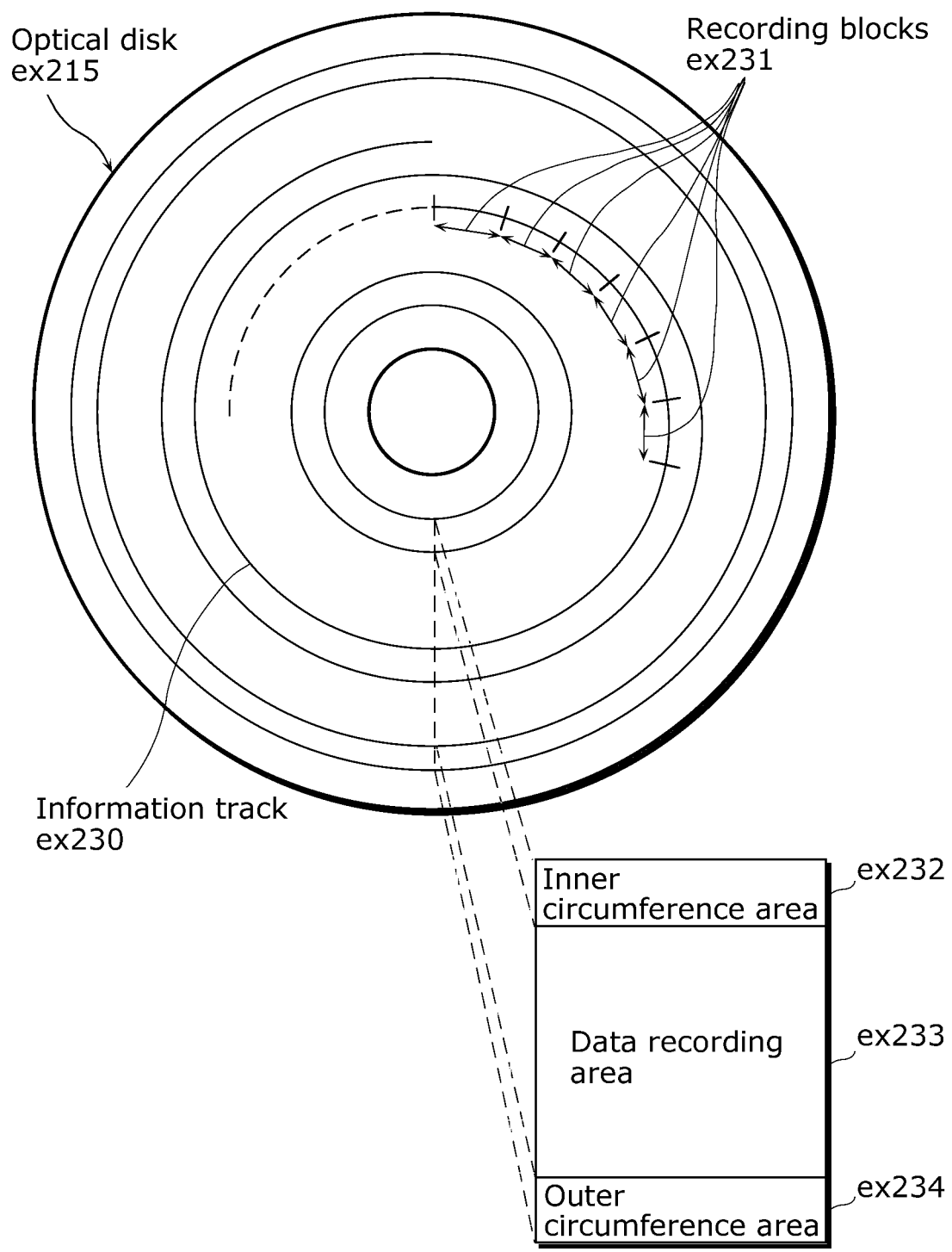
FIG. 21 illustrates an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
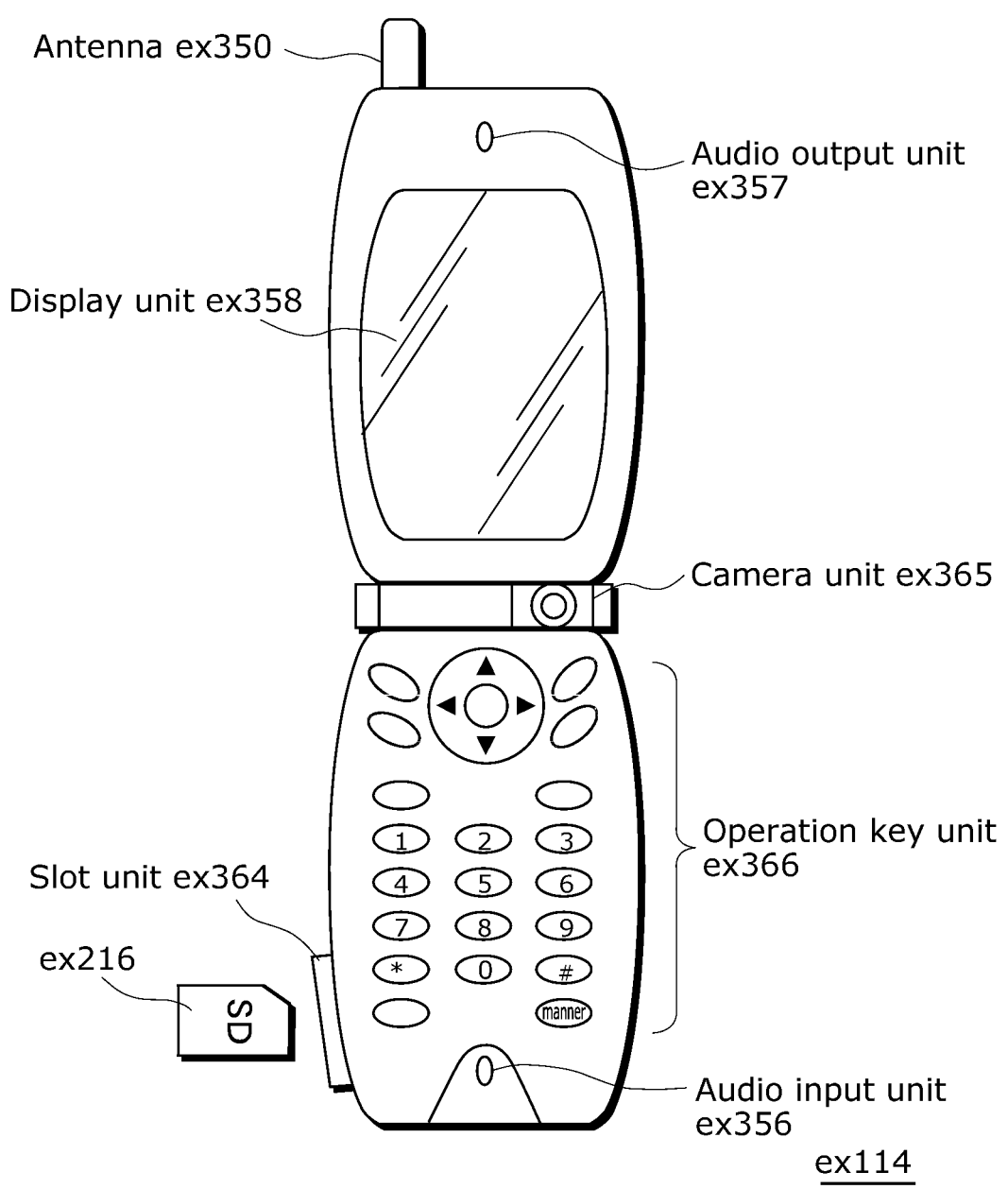
FIG. 22A illustrates an example of a cellular phone.

FIG. 22A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 22B:
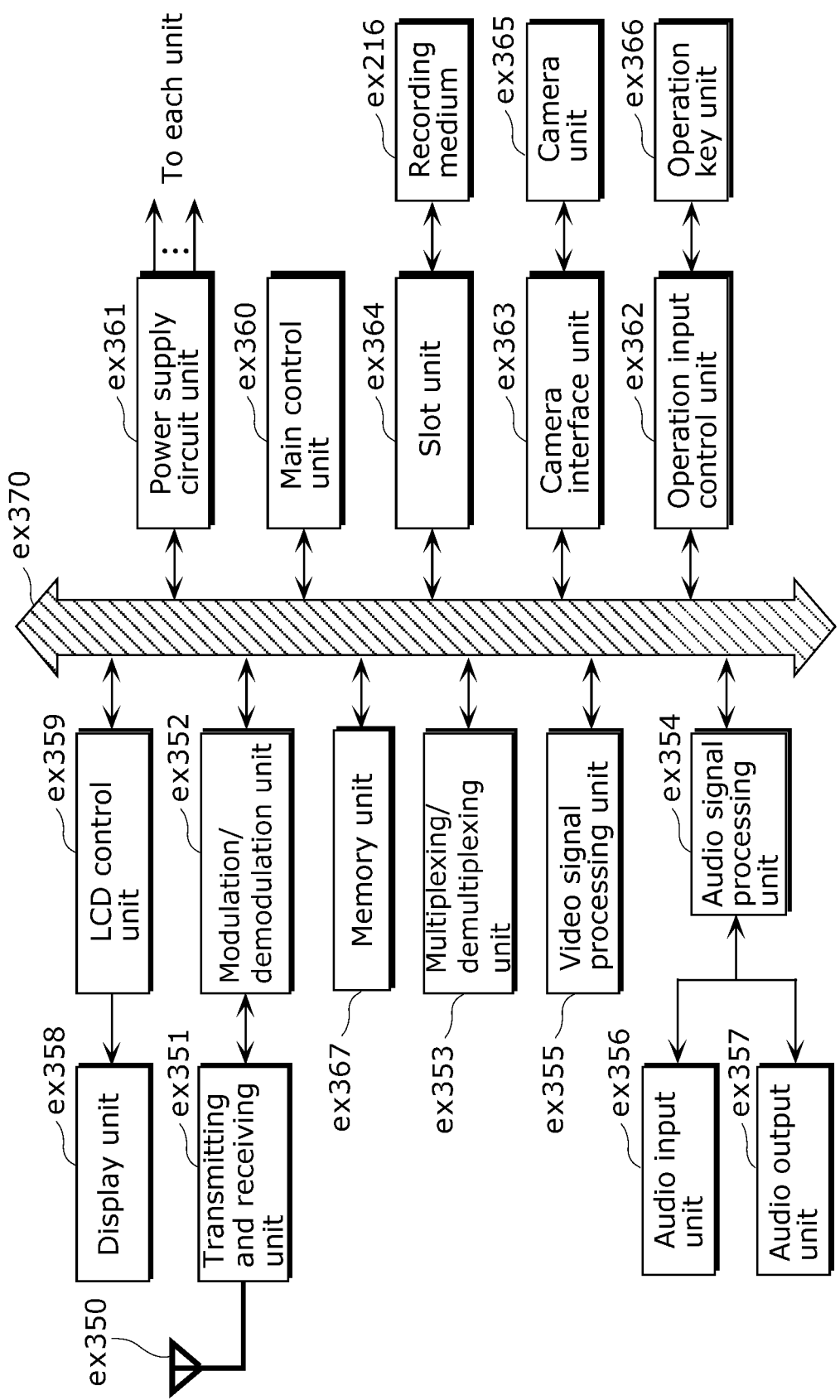
FIG. 22B is a block diagram illustrating an example of a configuration of a cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the video encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the video decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, various modifications and revisions can be made in any of the embodiments in the present disclosure.

Embodiment 4

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conforms cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

FIG. 23 illustrates a structure of multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
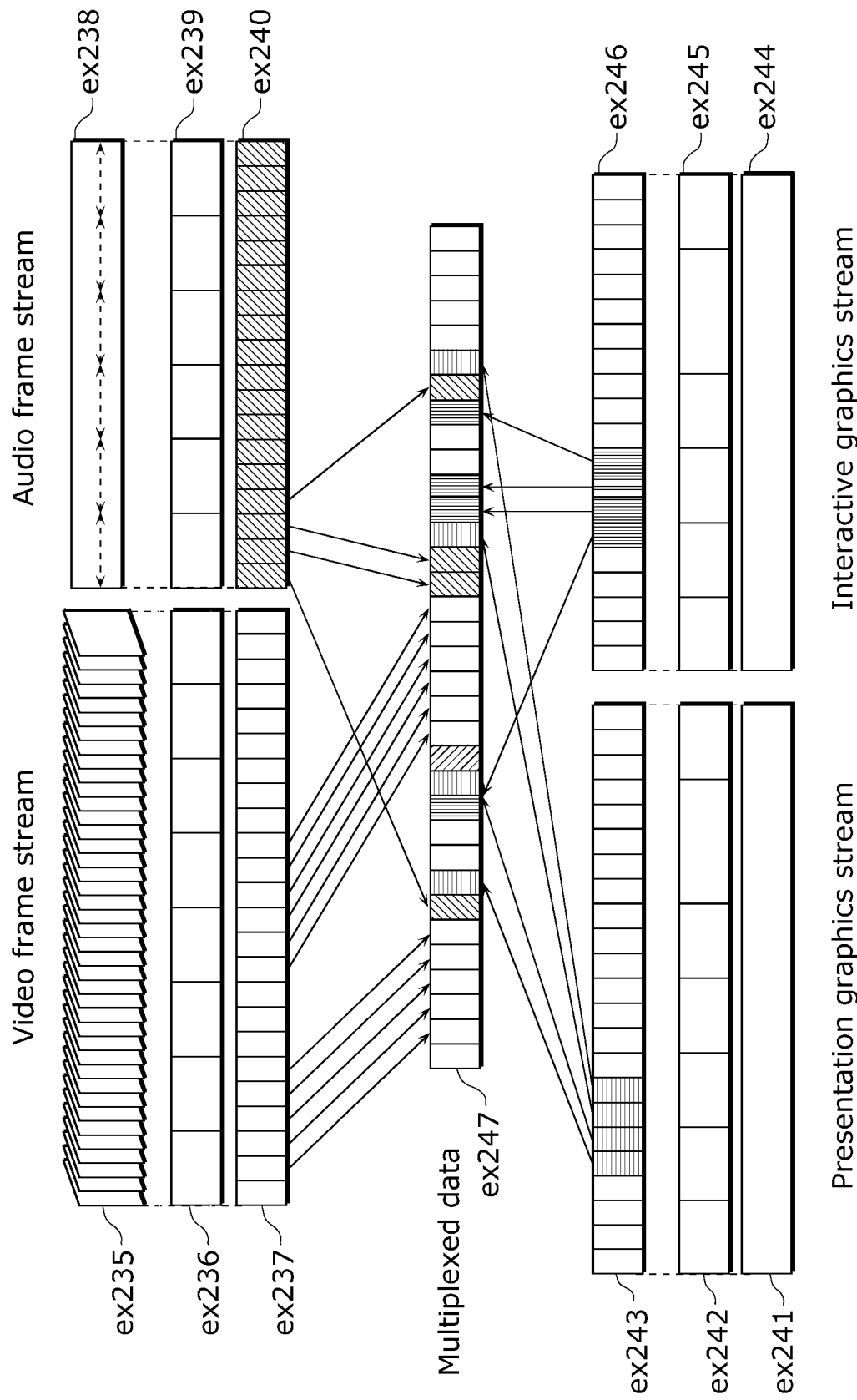
FIG. 24 schematically illustrates how each stream is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
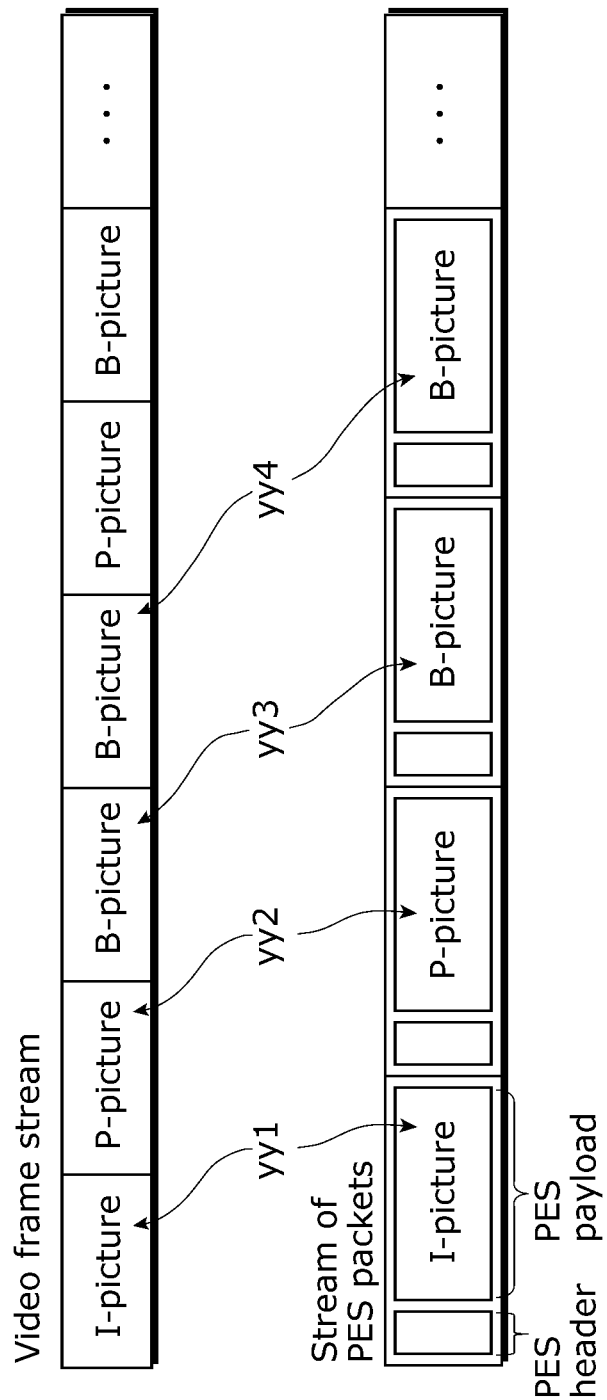
FIG. 25 illustrates how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
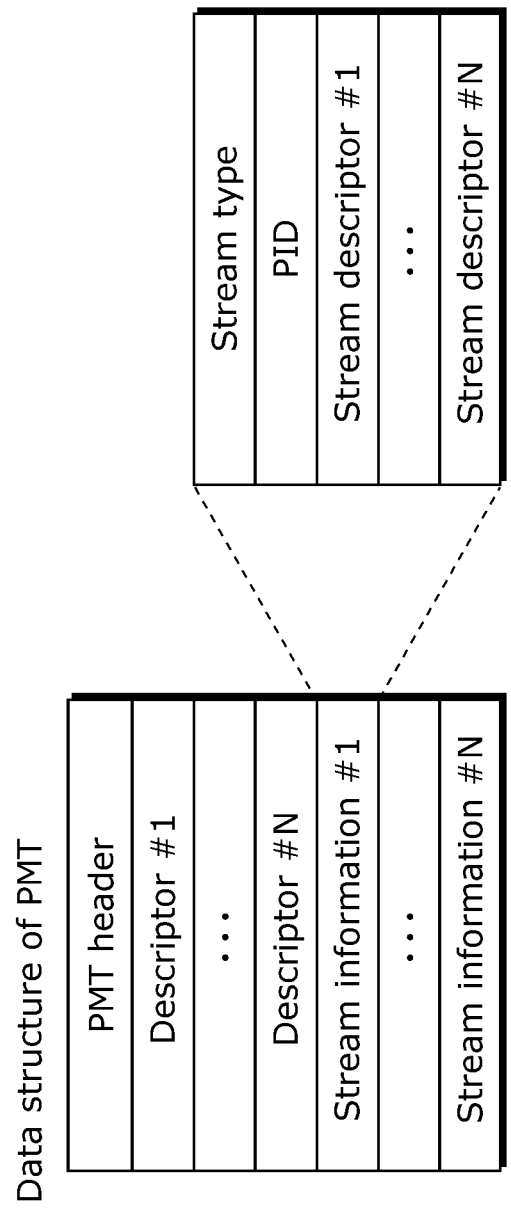
FIG. 27 illustrates a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
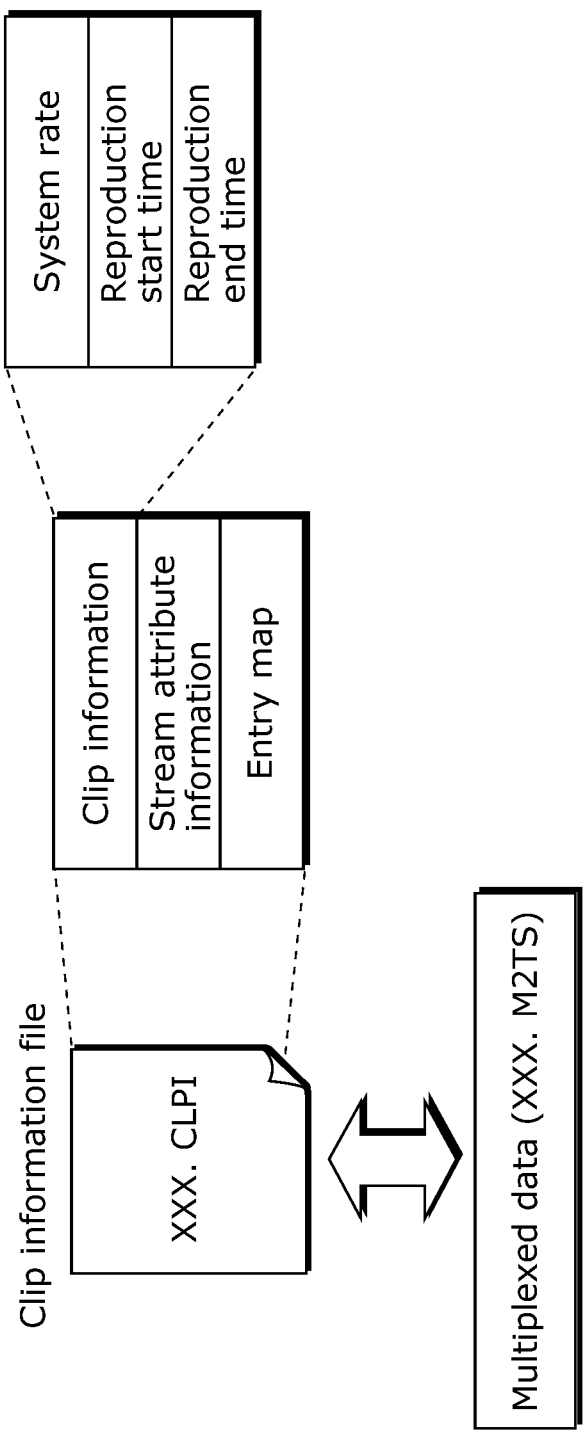
FIG. 28 illustrates an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
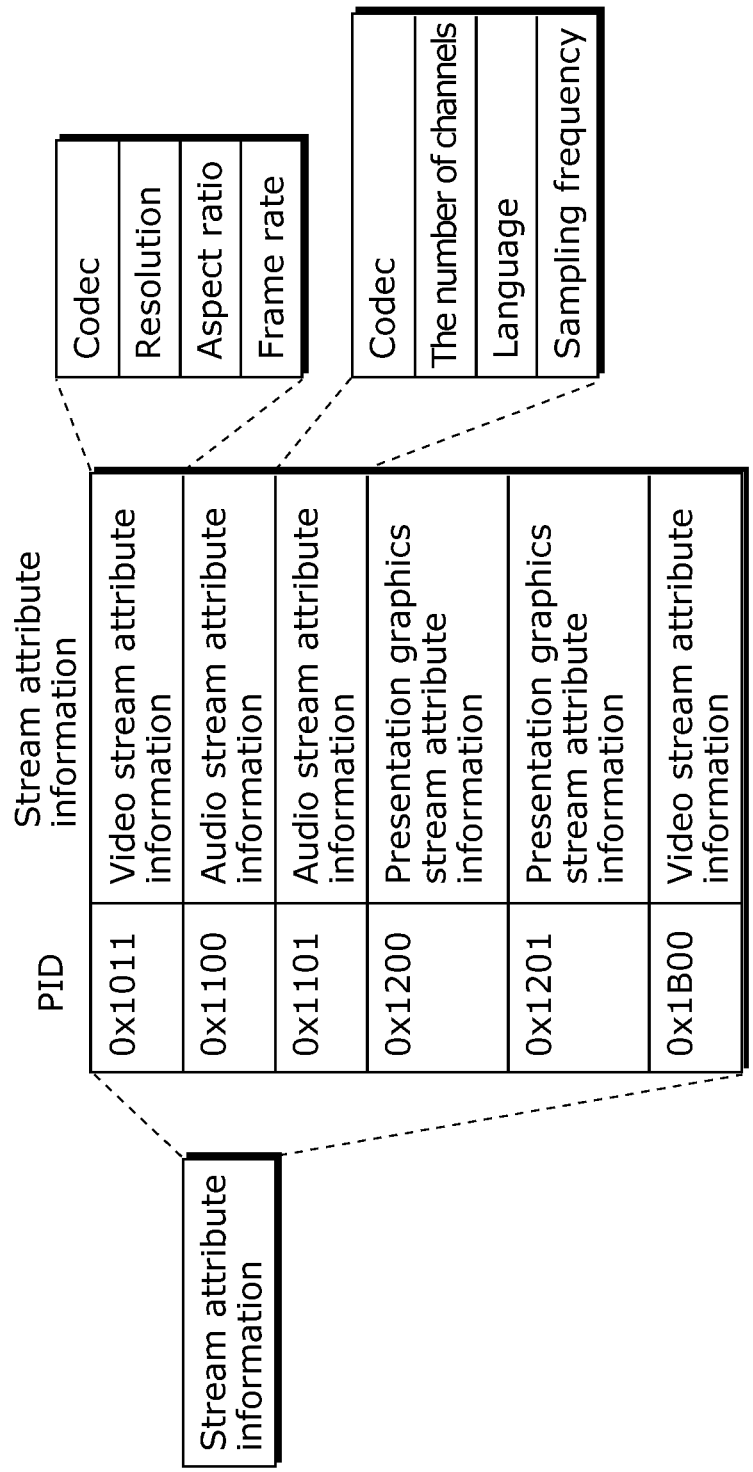
FIG. 29 illustrates an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Figure 30:
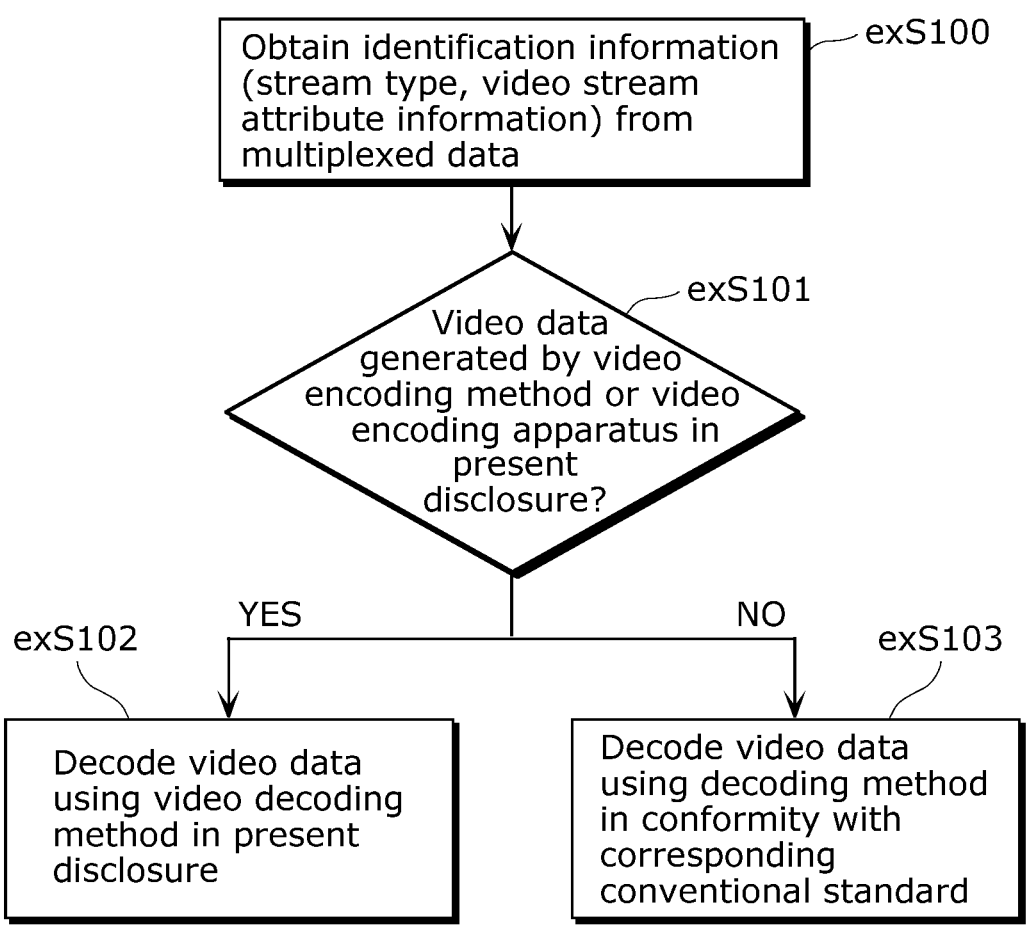
FIG. 30 illustrates steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 5

Figure 31:
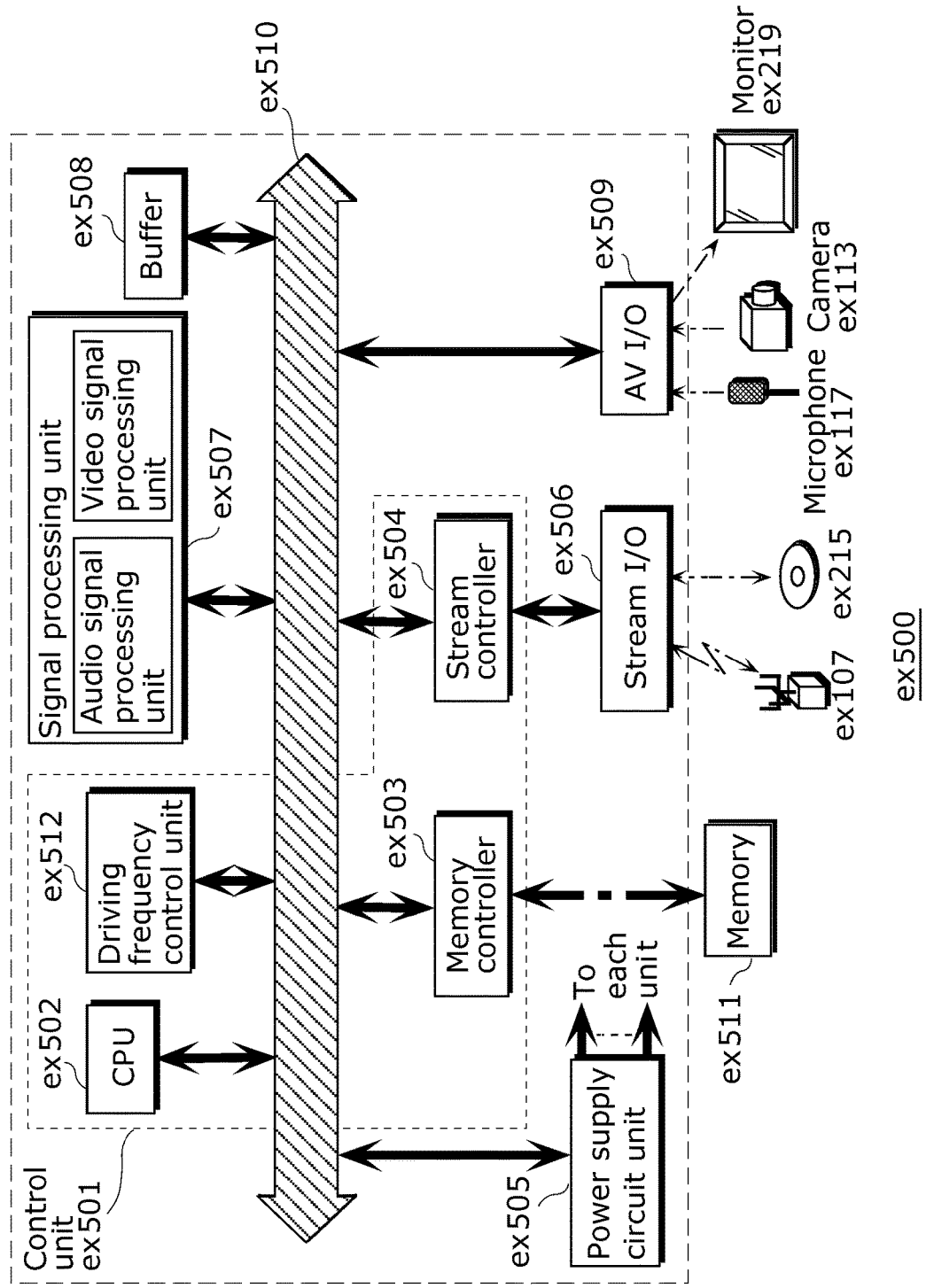
FIG. 31 is a block diagram illustrating an example of a configuration of an integrated circuit for implementing the moving picture coding method according to each embodiment.

Each of the moving picture coding method and the moving picture coding apparatus in each of embodiments is typically achieved in the form of an integrated circuit or a Large Scale Integrated (LSI) circuit. As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream JO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose. Such a programmable logic device can typically execute the moving picture coding method according to any of the above embodiments, by loading or reading from a memory or the like one or more programs that are included in software or firmware.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, there is a problem that the power consumption increases when the driving frequency is set higher.

Figure 32:
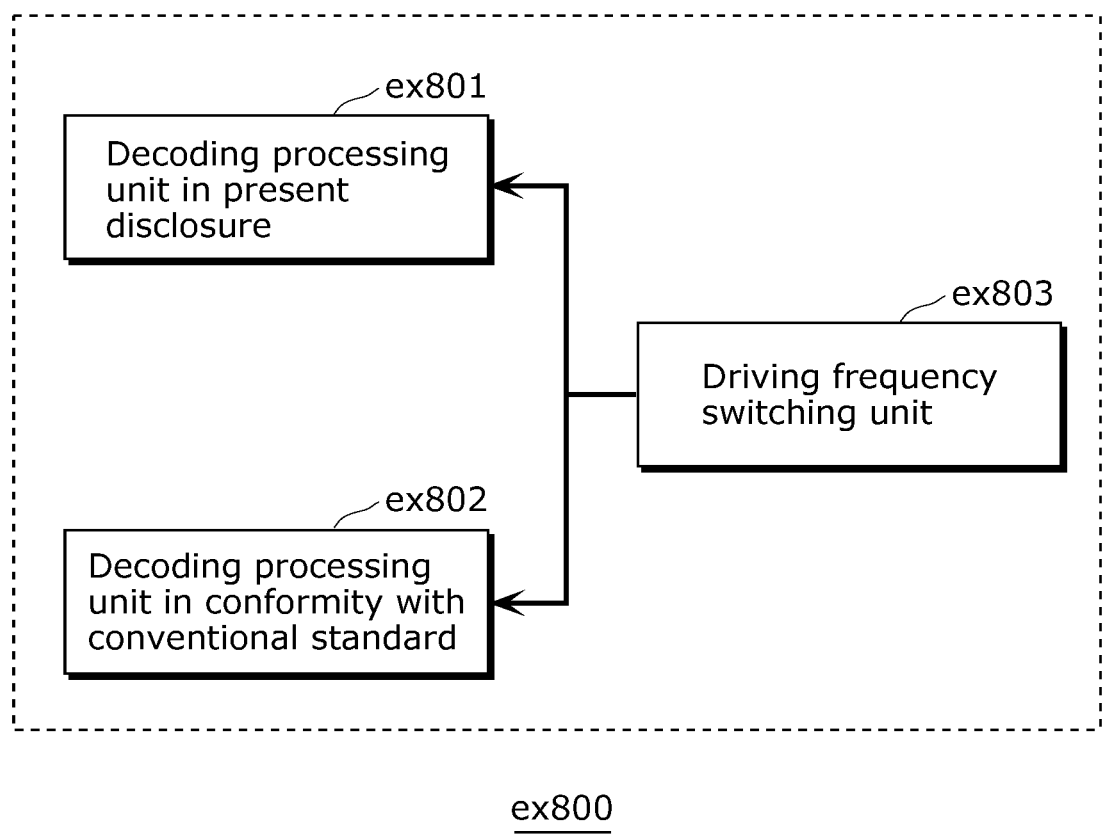
FIG. 32 illustrates a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
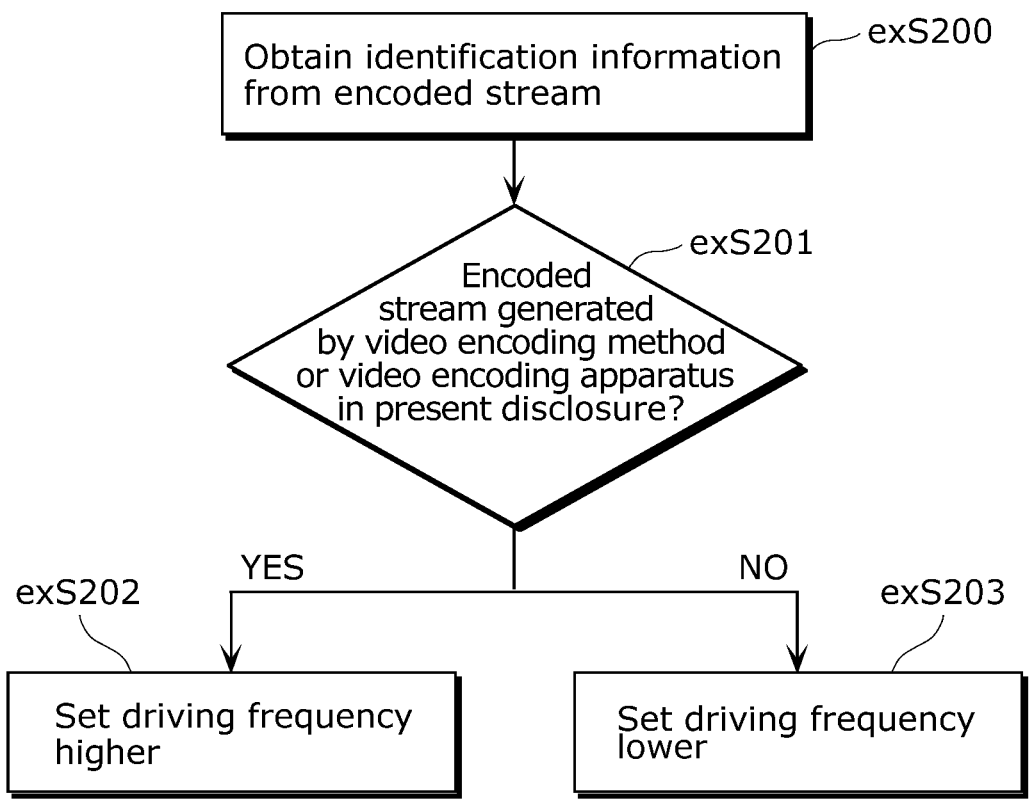
FIG. 33 illustrates steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
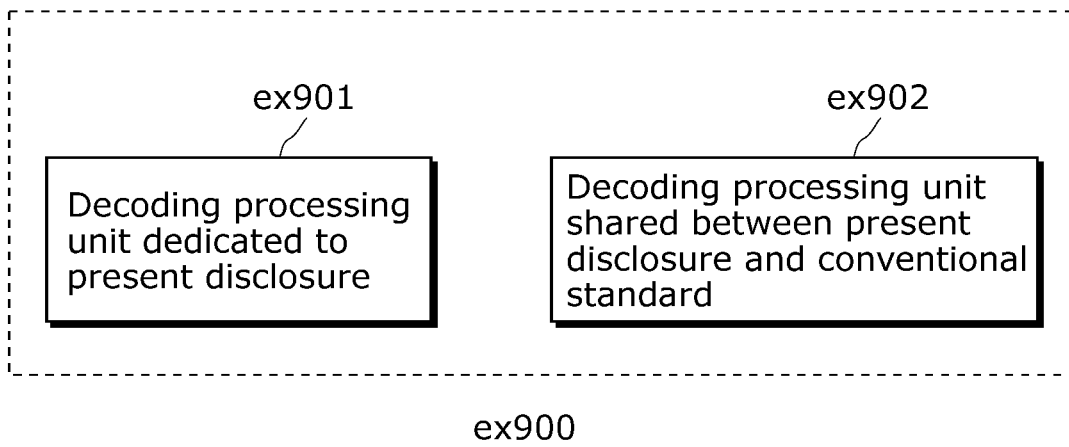
FIG. 35A illustrates an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by scalable encoding in particular, for example, the dedicated decoding processing unit ex901 is used for scalable encoding. Otherwise, the decoding processing unit is probably shared for one of the entropy decoding, inverse quantization deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
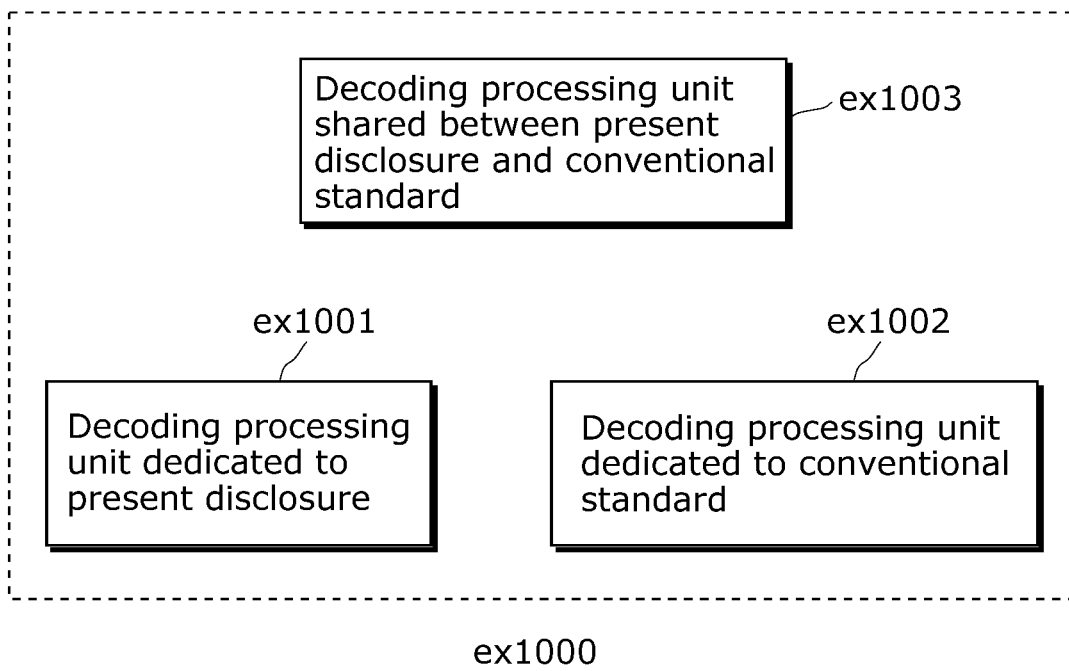
FIG. 35B illustrates another example of a configuration for sharing a module of the signal processing unit.

Furthermore, ex1000 in FIG. 35B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The video decoding method and apparatus or video encoding method and apparatus according to one or more exemplary embodiments disclosed herein are applicable to high-resolution information display devices or image-capturing devices which include video decoding apparatuses, such as a television, a digital video recorder, a car navigation system, a cellular phone, a digital still camera, and a digital video camera.

The invention claimed is:

1. A video encoding apparatus comprising:
processing circuitry; and
storage accessible from the processing circuitry,
wherein using the storage, the processing circuitry performs:
determining a number of layers; and
performing scalable encoding on pictures included in a video to generate a bitstream, based on a layer structure in which the layers are provided,
the number is equal to or smaller than a maximum layer count that is provided based on a frame rate of the video, and
a shallowest layer of the layers includes at least an I-picture, and the shallowest layer includes no B-picture, the I-picture being an intra-frame prediction picture, and the B-picture being a bi-directional reference prediction picture.

2. A video decoding apparatus comprising:
processing circuitry; and
storage accessible from the processing circuitry,
wherein using the storage, the processing circuitry performs:
decoding first information in a bitstream to generate a number of layers;
decoding pictures in a video in the bitstream to generate decoded pictures, scalable encoding having been performed on the pictures;
reordering, based on the number, the decoded pictures to generate reordered pictures; and
outputting the reordered pictures,
the number is equal to or smaller than a maximum layer count that is provided based on a frame rate of the video, and
a shallowest layer of the layers includes at least an I-picture, and the shallowest layer includes no B-picture, the I-picture being an intra-frame prediction picture, and the B-picture being a bi-directional reference prediction picture.

3. A video encoding apparatus comprising:
memory; and
at least one processor coupled to the memory and configured to:
perform scalable encoding on pictures included in a video to generate a bitstream, based on a layer structure in which layers are provided; and
determine a maximum number of the layers that is determined based on a frame rate of the video, wherein
a shallowest layer of the layers includes at least an I-picture, and the shallowest layer includes no B-picture, the I-picture being an intra-frame prediction picture, and the B-picture being a bi-directional reference prediction picture.

4. A video decoding apparatus comprising:
memory; and
at least one processor coupled to the memory and configured to:
decode pictures in a video in a bitstream to generate decoded pictures, scalable encoding having been performed on the pictures based on a layer structure in which layers are provided; and
parse the bitstream to derive a maximum number of the layers that is determined based on a frame rate of the video, wherein a shallowest layer of the layers includes at least an I-picture, and the shallowest layer includes no B-picture, the I-picture being an intra-frame prediction picture, and the B-picture being a bi-directional reference prediction picture.

* * * * *